May 30, 1933. R. R. CONE 1,911,436
APPARATUS FOR USE IN BOWLING
Filed April 6, 1929 18 Sheets-Sheet 7
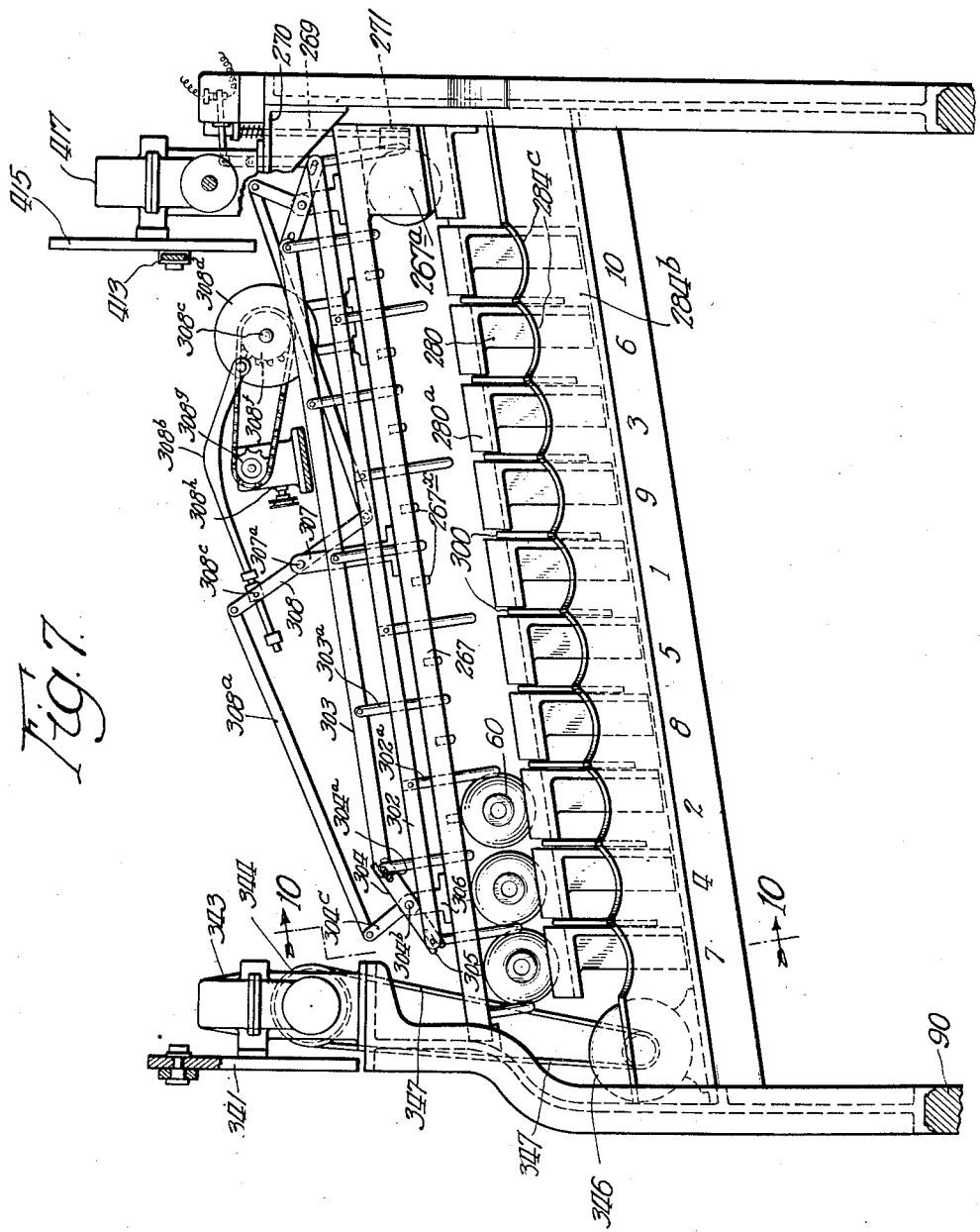
Inventor
Ralph R. Cone
By Williams Bradbury
McCaleb & Hinkle Attys

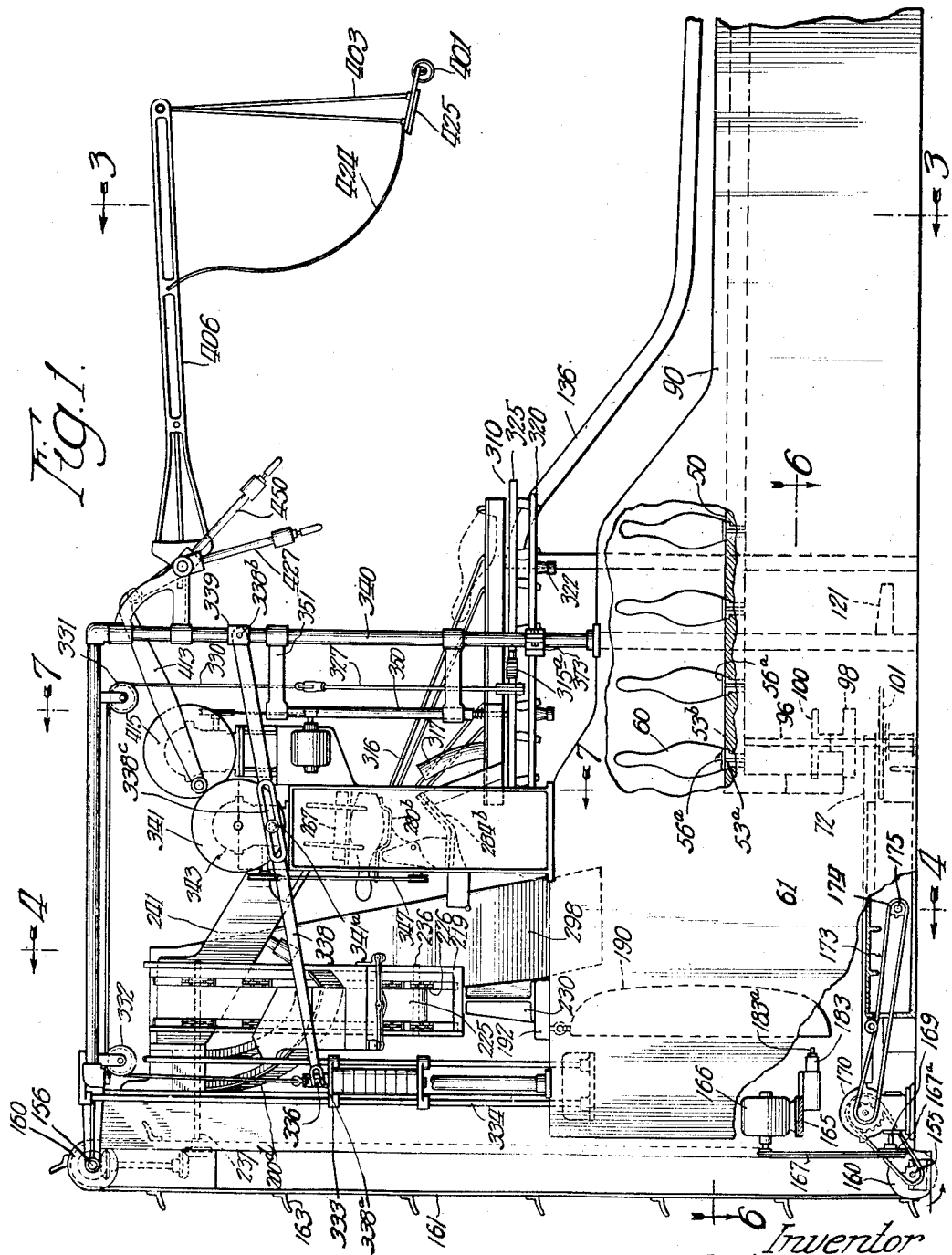

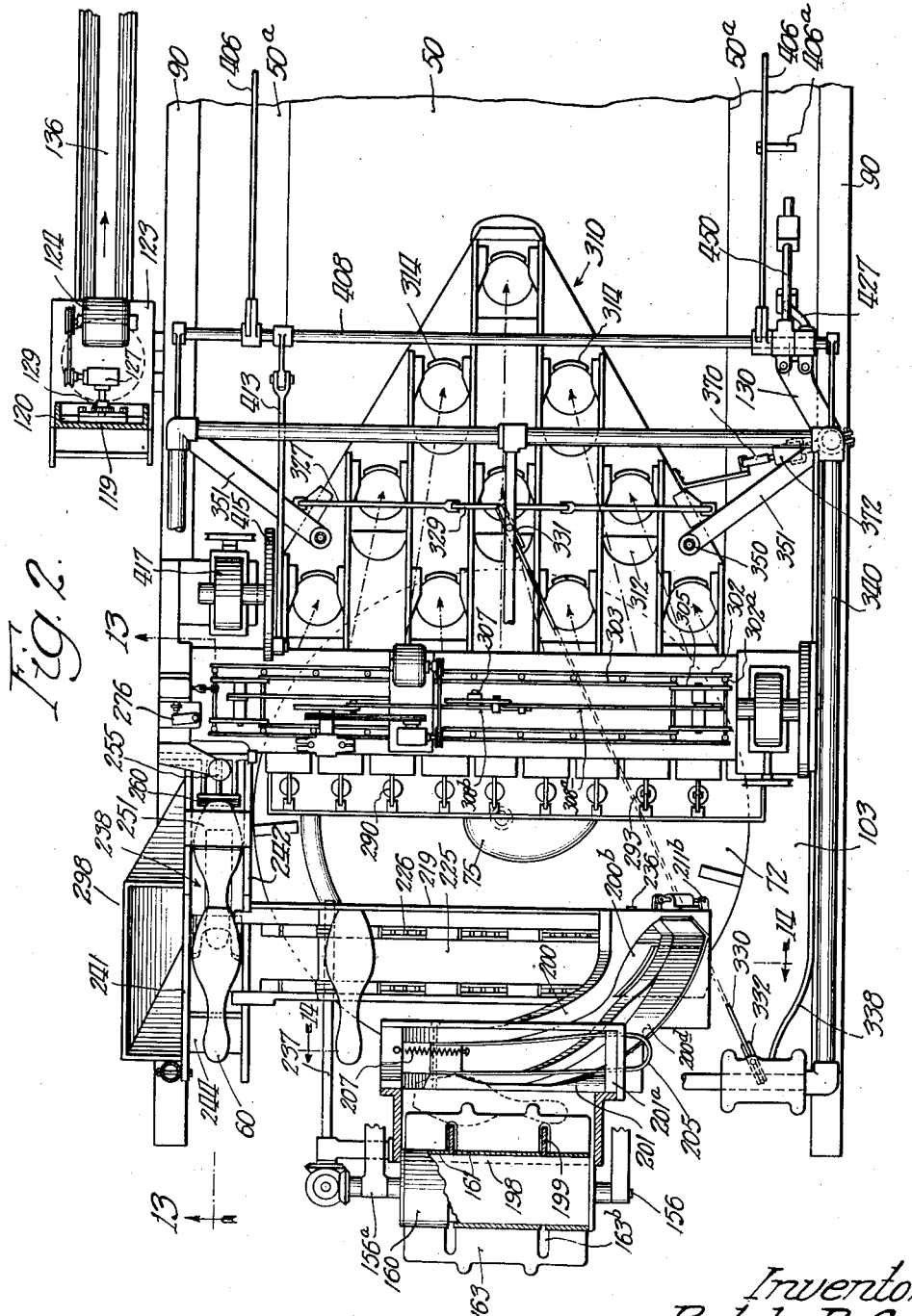

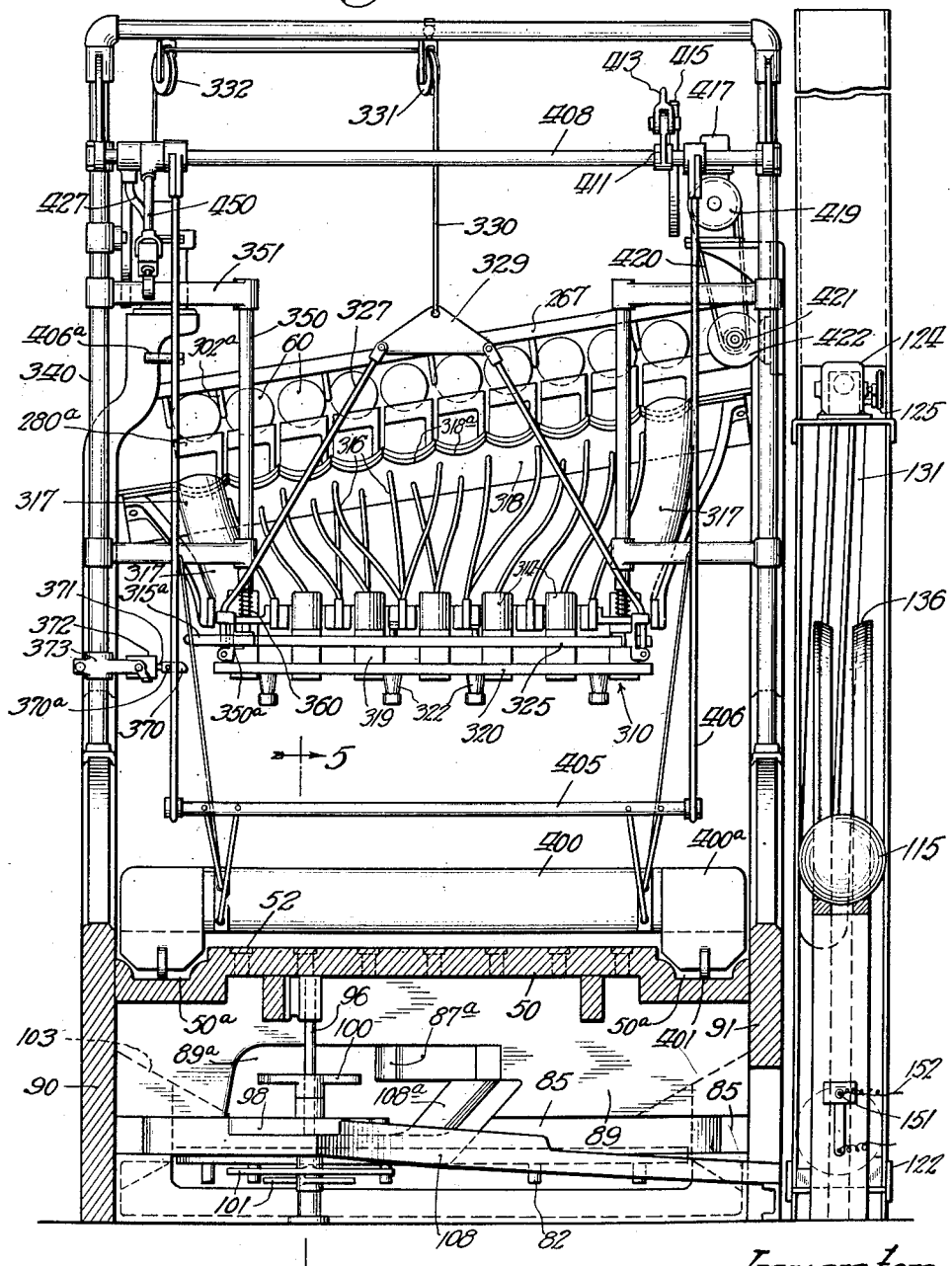

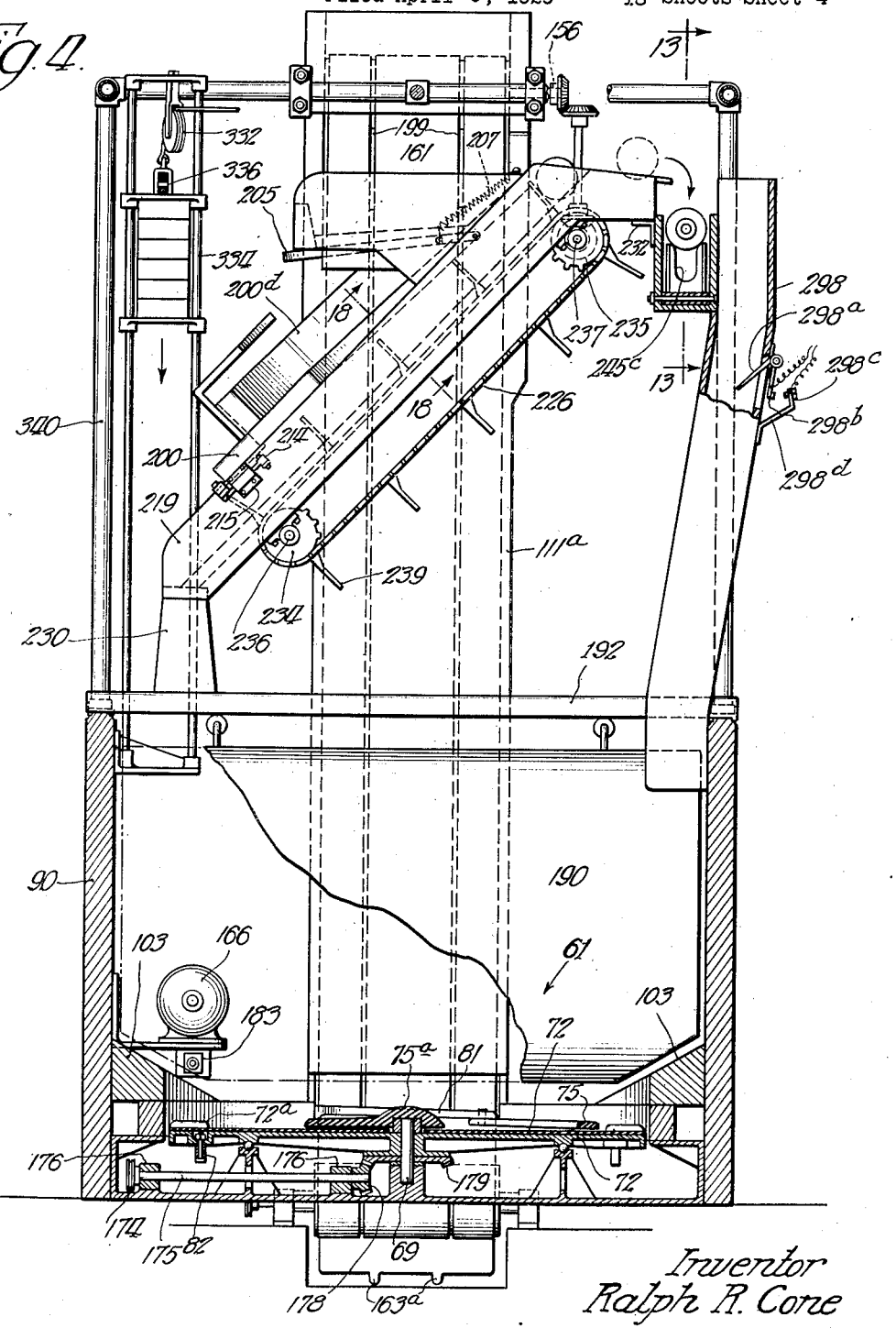

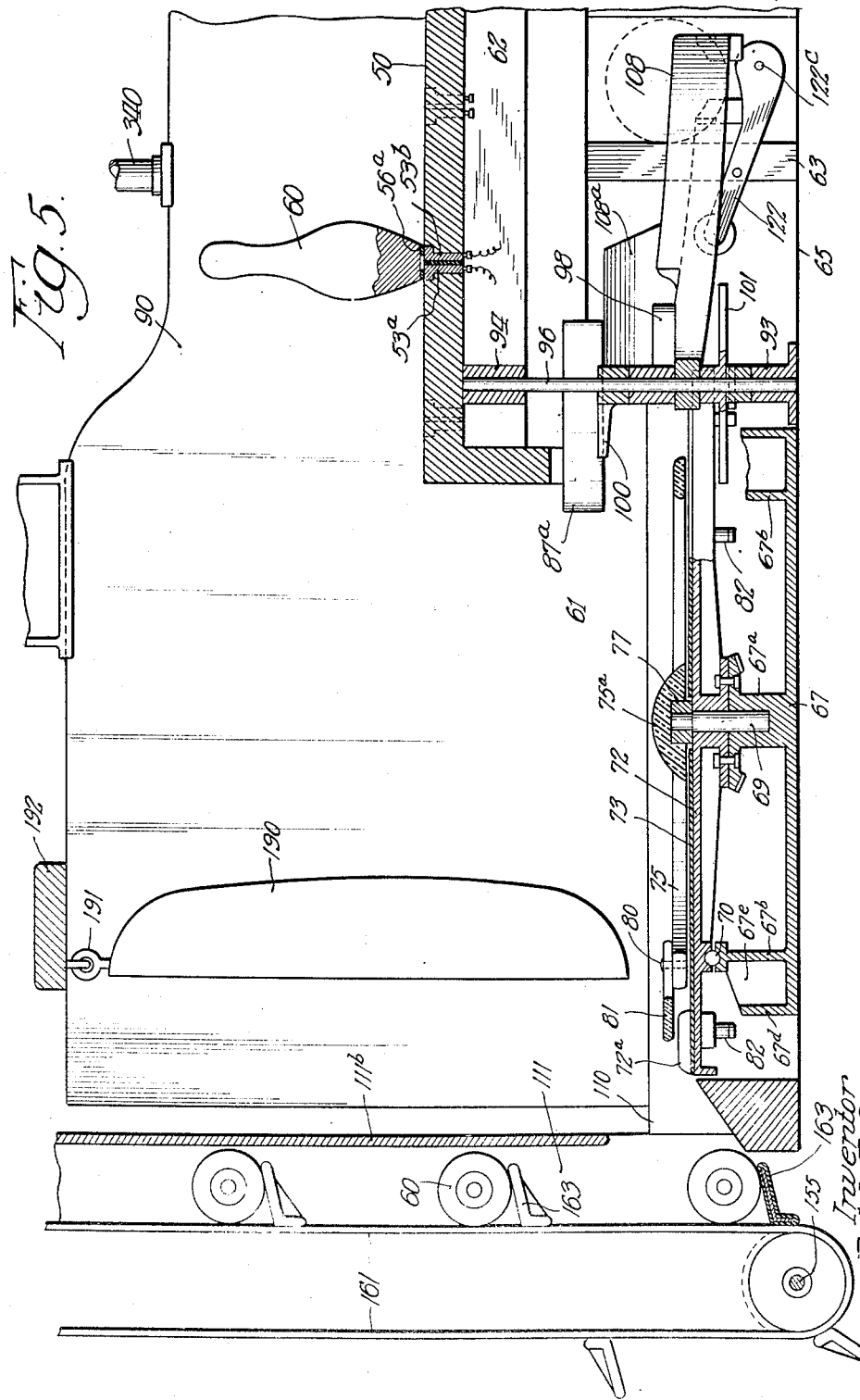

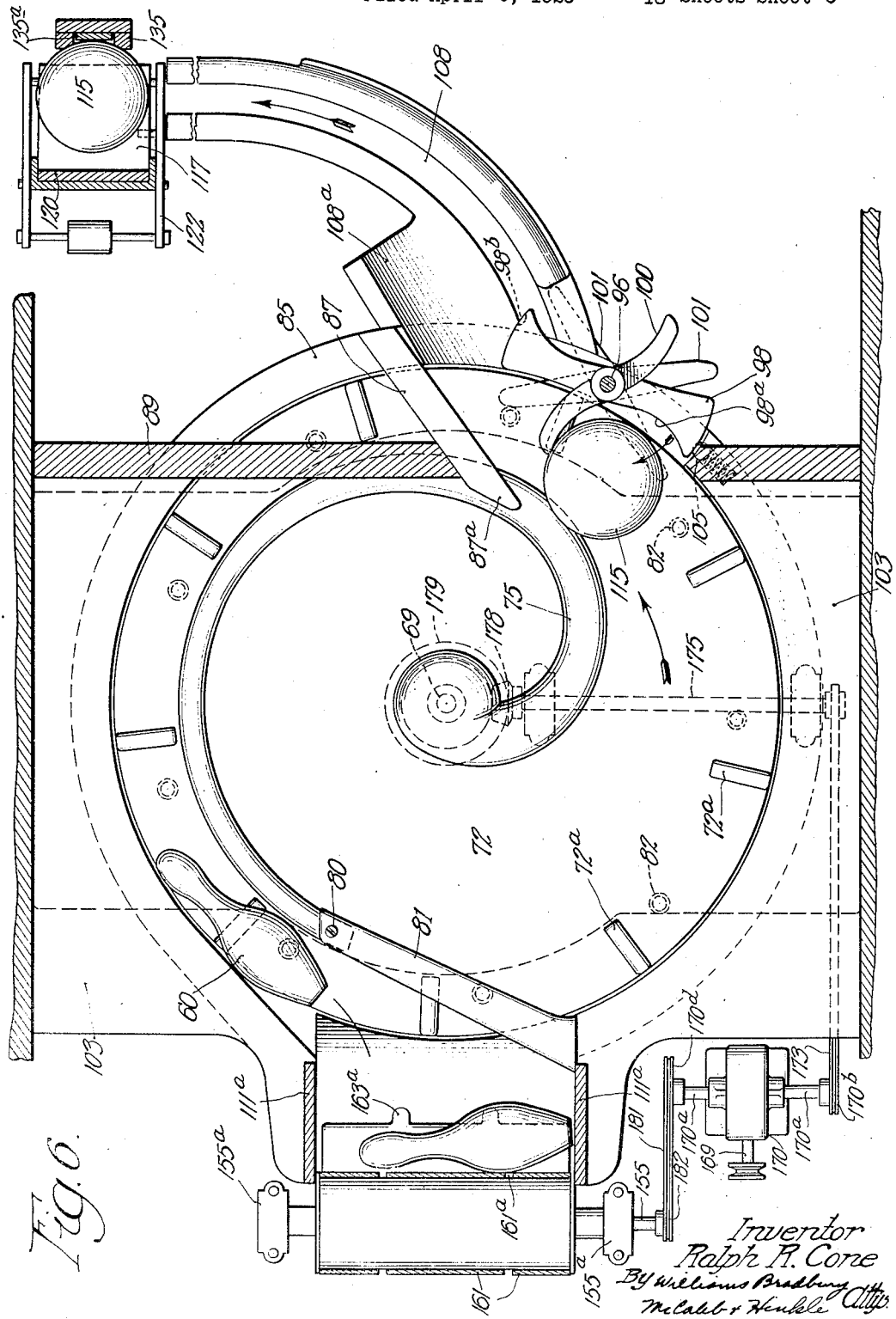

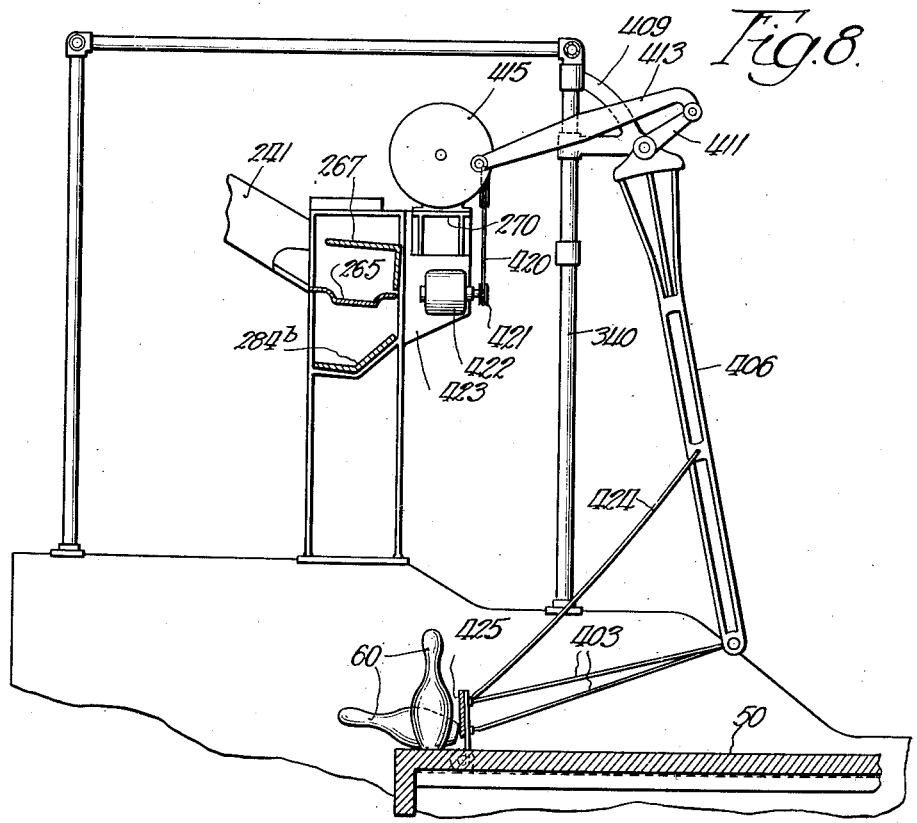
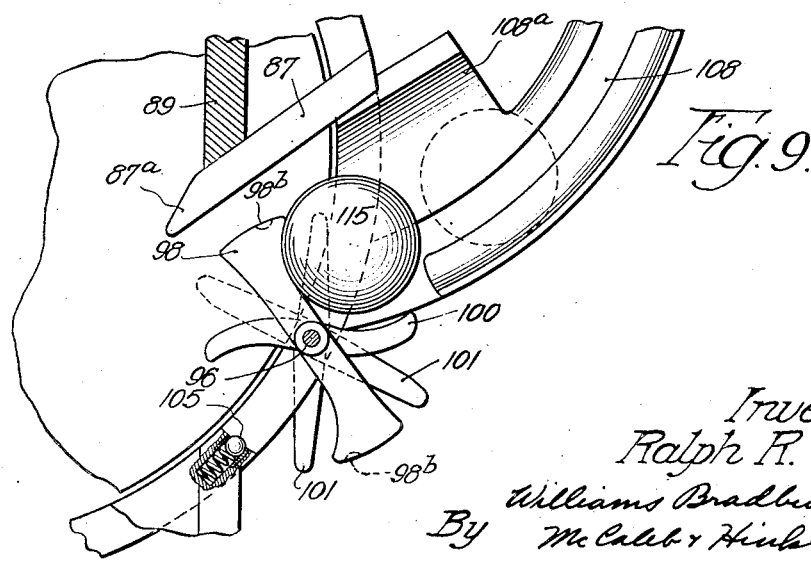

May 30, 1933.  R. R. CONE  1,911,436
APPARATUS FOR USE IN BOWLING
Filed April 6, 1929   18 Sheets-Sheet 9
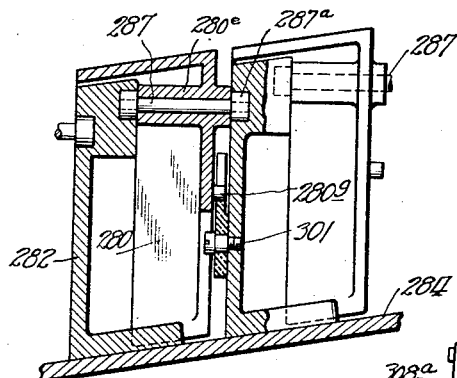
Fig. 12
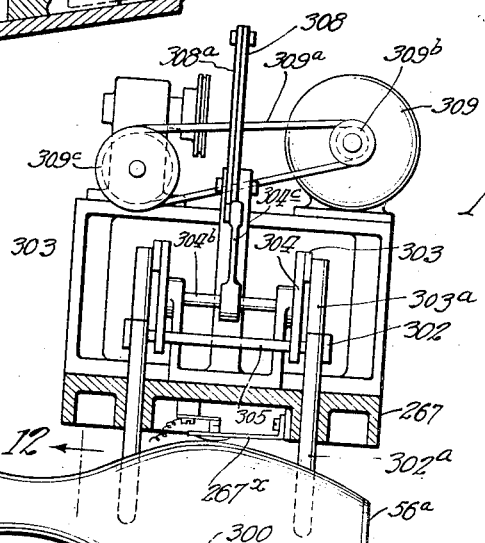
Fig. 10.
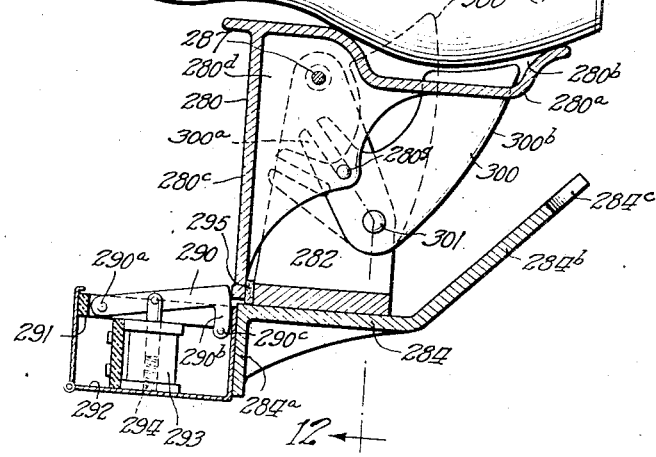
Inventor
Ralph R. Cone
By Williams Bradbury
McCaleb & Hinkle Attys.

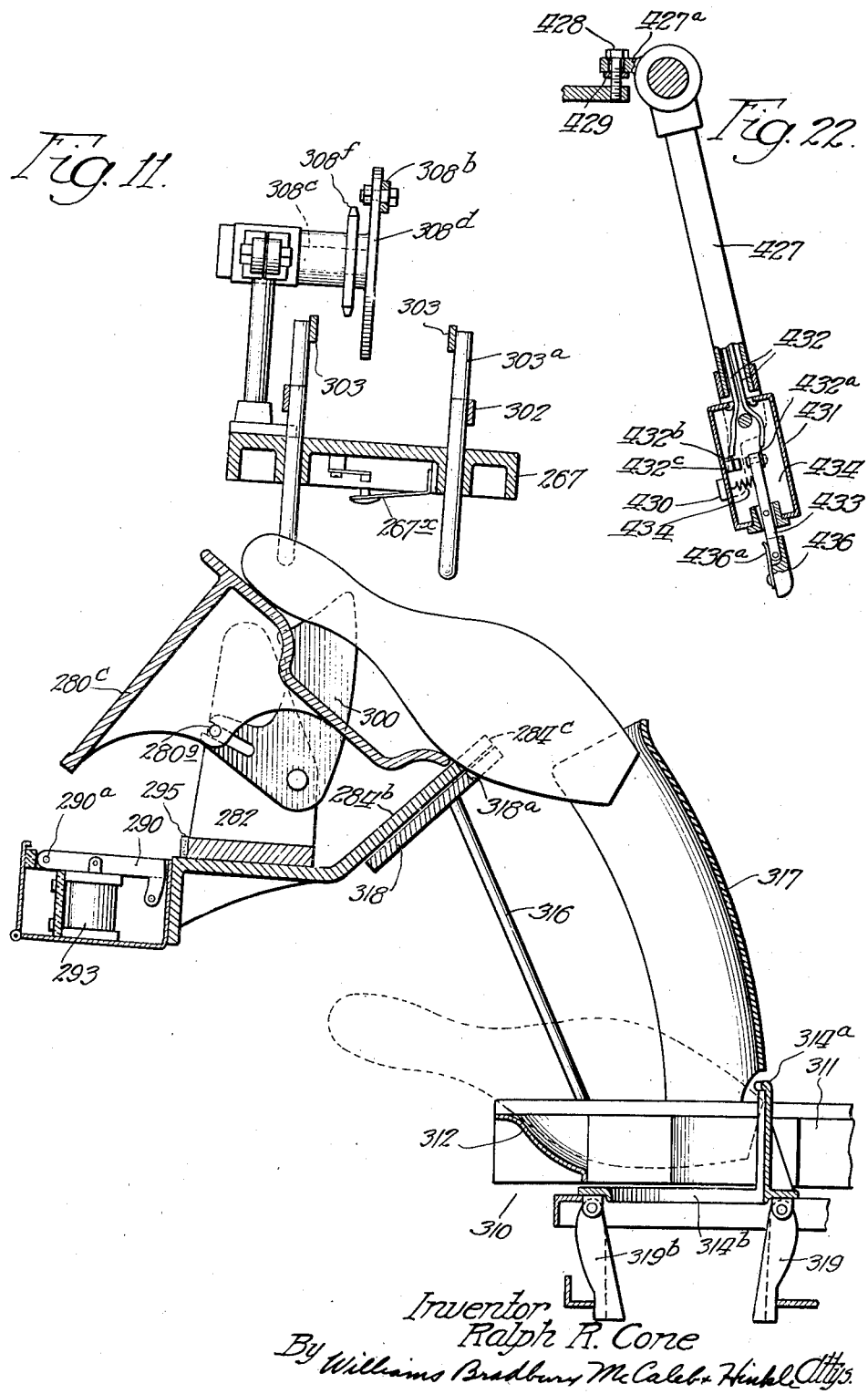

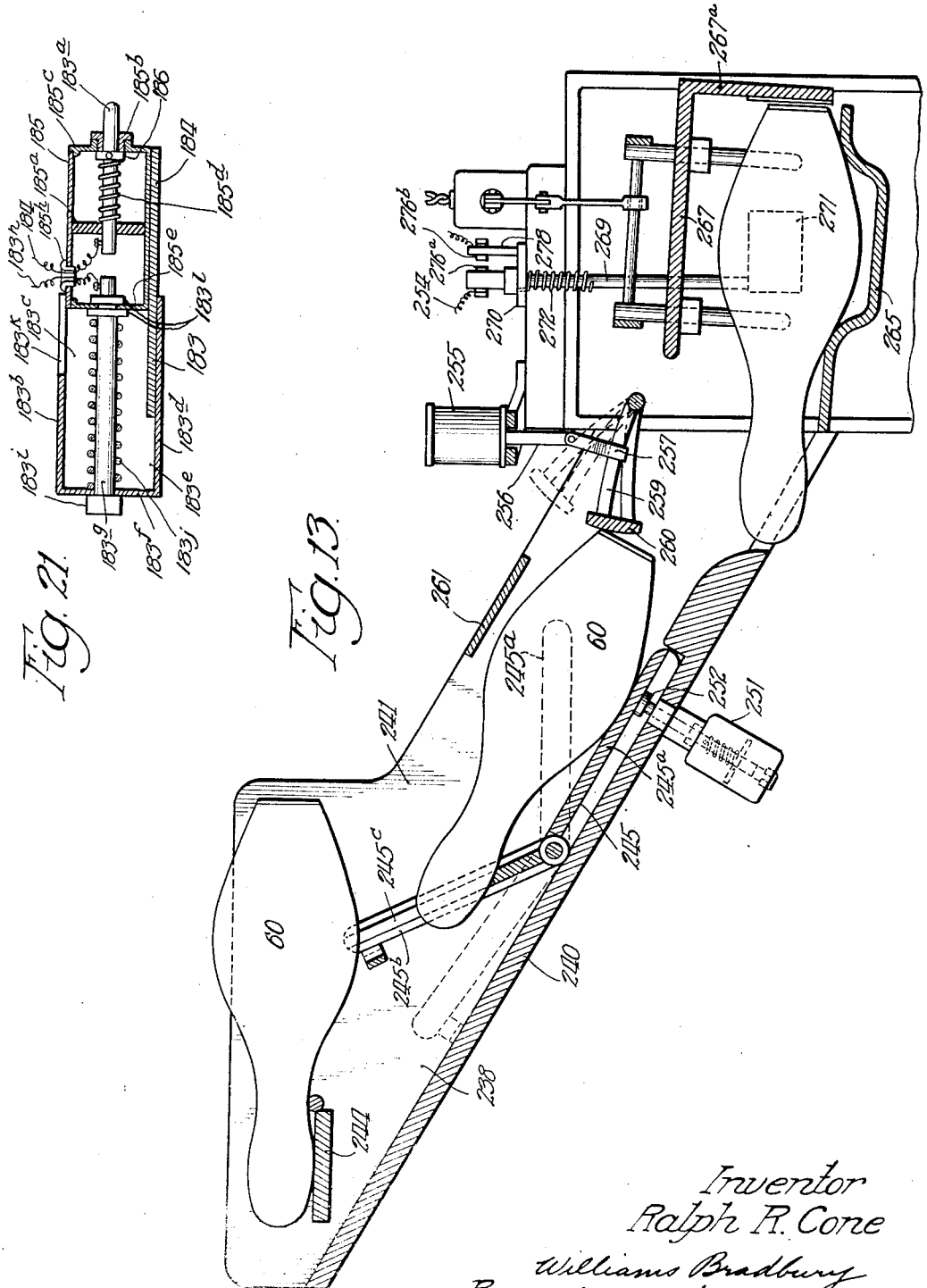

May 30, 1933.  R. R. CONE  1,911,436
APPARATUS FOR USE IN BOWLING
Filed April 6, 1929    18 Sheets-Sheet 12
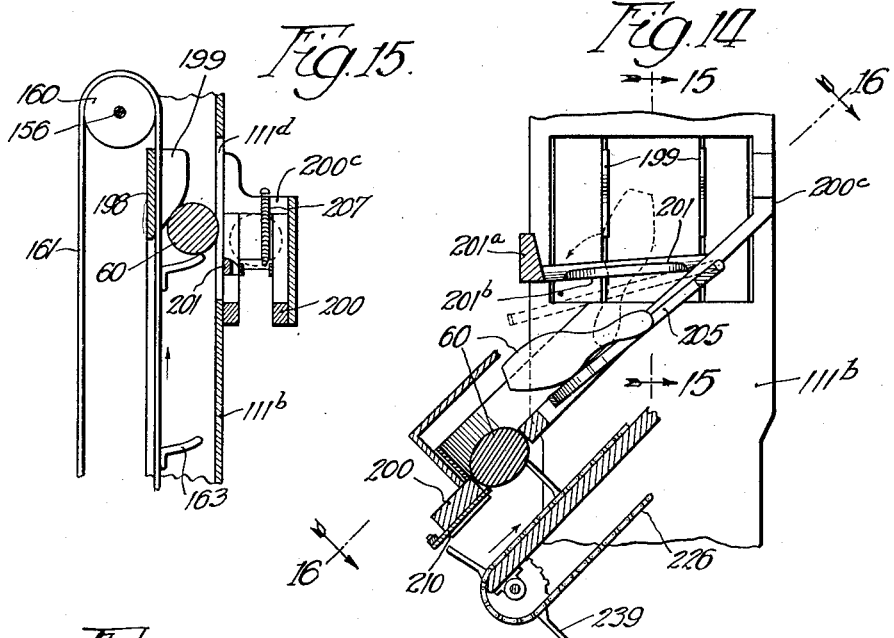
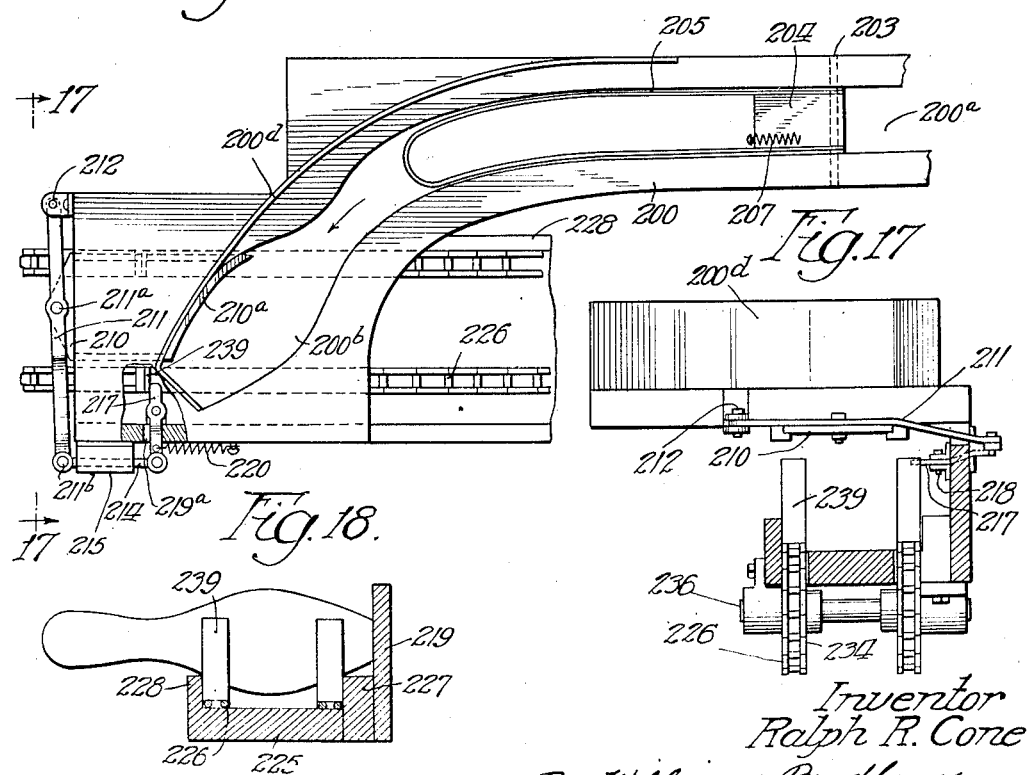
Inventor
Ralph R. Cone
By Williams Bradbury
McCaleb & Hulbert Attys.

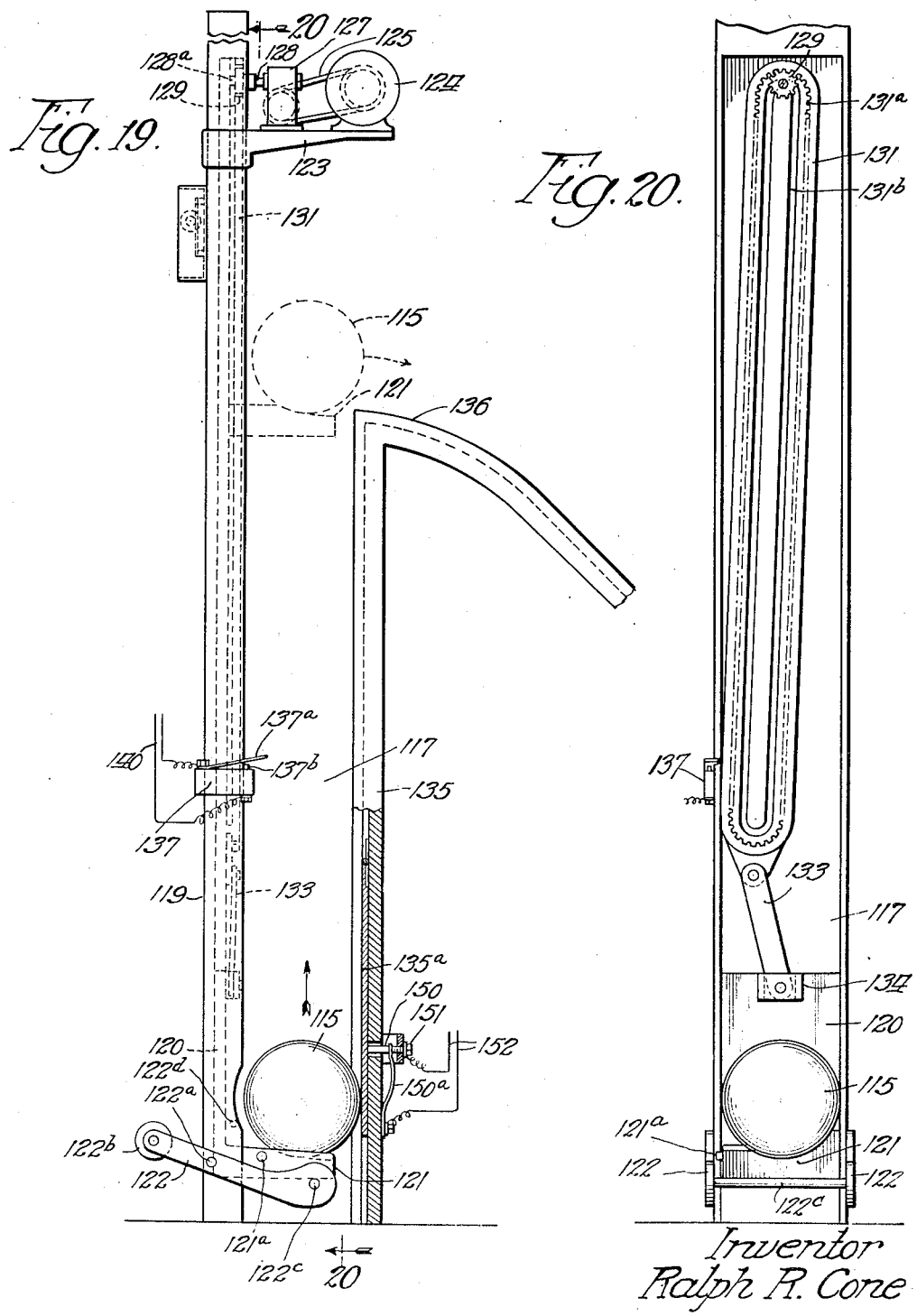

May 30, 1933.     R. R. CONE     1,911,436
APPARATUS FOR USE IN BOWLING
Filed April 6, 1929     18 Sheets-Sheet 14

Inventor
Ralph R. Cone
By Williams Bradbury
McCaleb & Hinkle   Attys.

May 30, 1933.  R. R. CONE  1,911,436
APPARATUS FOR USE IN BOWLING
Filed April 6, 1929   18 Sheets-Sheet 15

Inventor
Ralph R. Cone
By Williams Bradbury
McCaleb & Hinkle Attys.

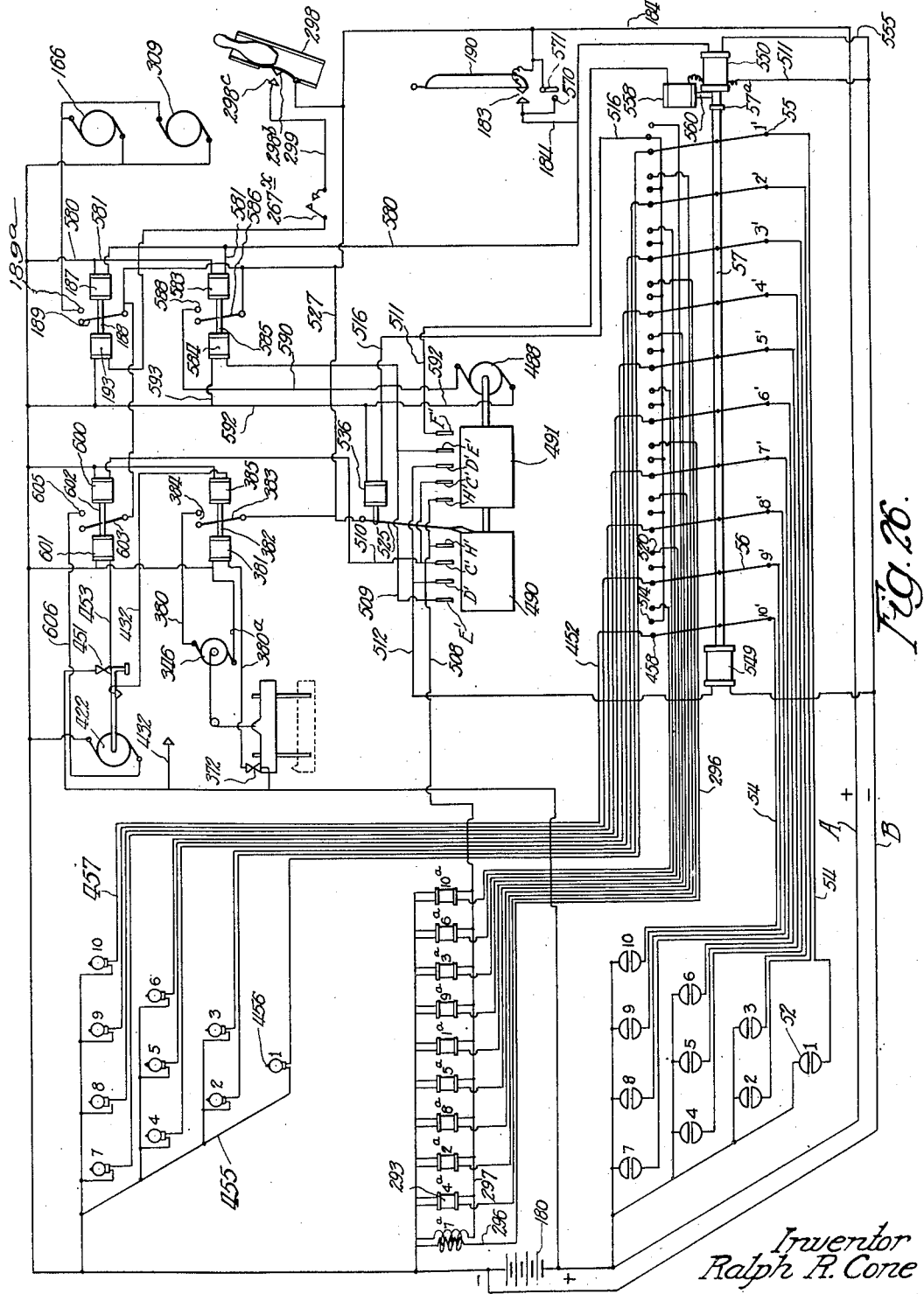

May 30, 1933.　　　R. R. CONE　　　1,911,436
APPARATUS FOR USE IN BOWLING
Filed April 6, 1929　　　18 Sheets-Sheet 17
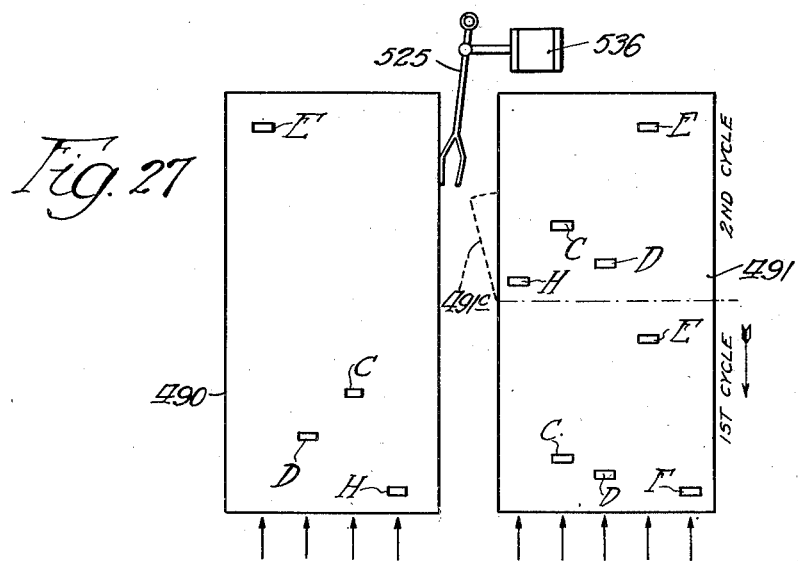
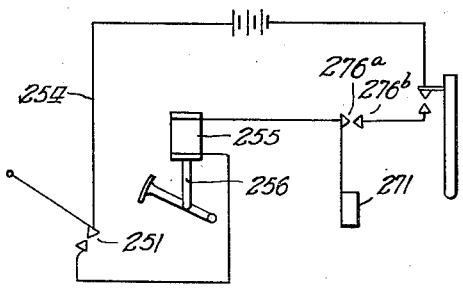
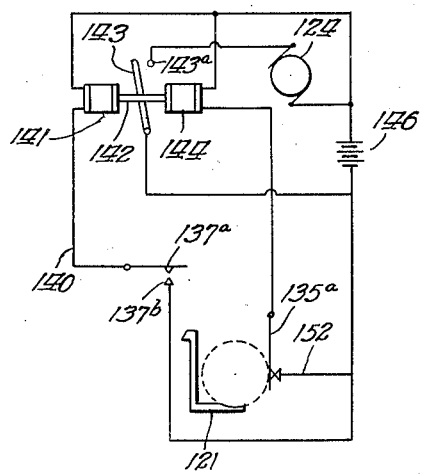
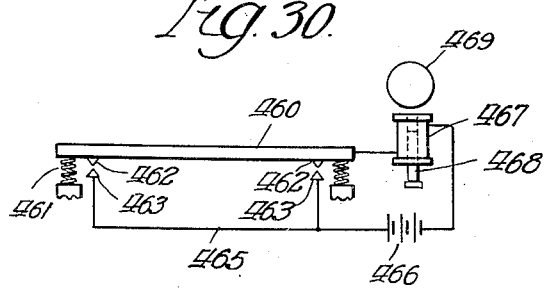
Inventor
Ralph R. Cone
By Williams Bradbury
McCaleb & Hinkle　Attys.

May 30, 1933.  R. R. CONE  1,911,436
APPARATUS FOR USE IN BOWLING
Filed April 6, 1929  18 Sheets-Sheet 18
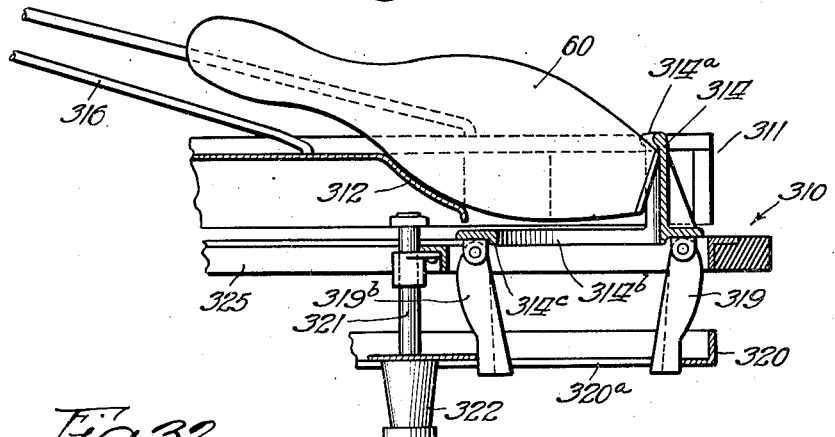
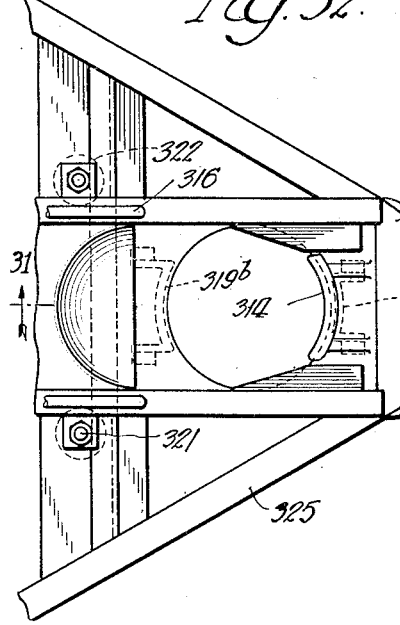
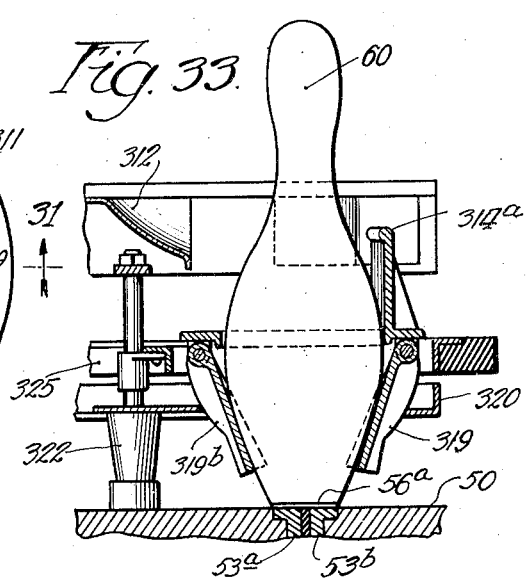
Inventor
Ralph R. Cone
By Williams Bradbury
McCaleb & Hinkle Attys.

Patented May 30, 1933

1,911,436

UNITED STATES PATENT OFFICE

RALPH R. CONE, OF GLEN ELLYN, ILLINOIS, ASSIGNOR TO WILLIAM H. A. MARTENS, OF MAYWOOD, ILLINOIS

APPARATUS FOR USE IN BOWLING

Application filed April 6, 1929. Serial No. 352,952.

This invention relates to novel apparatus for use in bowling and comprises automatically acting means for setting and re-setting the bowling pins and returning the ball to the head end of the bowling alley after each bowling operation.

Among the objects of my invention are the following: To provide mechanism or means actuated under the impact of the bowling ball or pins or manually if so desired, to segregate the ball from the pins and to return it to the head end of the alley, the pins being delivered singly and continuously to a plurality of receiving members associated with a setting rack in combination with controlling means which will actuate said receiving members to deposit those pins in the setting rack which are to be re-set upon the alley, and to effect such set or re-set of the pins; to provide means to discontinue the feeding of the bowling pins after the receiving members have been charged and after a surplus storage space has been charged; to provide means automatically actuated to sweep the bowling alley and adjacent gutters after the delivery of each ball; to provide actuating and controlling means for the pin setting mechanism actuated in part by said sweeping means; to provide automatically actuating means to true up or properly position pins upon their receiving members preliminary to charging the pin setting mechanism; to provide means associated with pin feeding means to properly position the bowling pins during their transit to the pin receiving members, i. e. to make certain that all of the pins will be delivered with their heads pointing in the proper direction; to provide automatic control means to initiate, discontinue and control the operation of certain of the mechanisms included in my apparatus; to provide new and novel electrical circuits and control members functioning automatically to properly time the start, operation and stop of the various mechanisms included in my apparatus; to provide a new and novel indicating means associated with my apparatus to automatically indicate the pins left standing after the delivery of a ball; to provide automatically actuating apparatus to re-set all of the pins in the event of a strike and to re-set only those pins which were left standing in the event all of the pins were not knocked down by the first ball delivered in a frame; to provide automatically operating electrical control means for the apparatus which re-sets all of the pins in the event of a strike or those pins left standing if a strike is not made; and in general to provide new and novel apparatus and mechanism carrying out each of the functions and operations incident to the general operation of my apparatus.

Briefly, my apparatus comprises pins and circuit closing members at their bases co-acting with spaced contacts on the spots on which such pins are set, the pins and contacts being included in circuits utilized to control the release of pins from corresponding pin receiving members with which in turn are associated the corresponding pockets of a pin setting rack, as I term it, operable to set all or less than all of the pins upon their spots on the alley. A rotatable table is provided in the pit with which is associated means to segregate or separate the ball from the pins, means being provided to deliver the ball to its return track upon which it rolls to the head end of the alley, and means being provided to receive and convey the pins to ultimate delivery upon the pin receiving members. This last named means includes or is associated with mechanism which properly positions the pins endwise so that the heads of all are pointing in the proper direction, and also includes mechanism which insures the delivery of the pins one at a time in proper position upon an inclined trackway formed by the pin receiving members. Incidentally, means is also provided to true up the bowling pins in their passage over the trackway so that they are always properly aligned for delivery to the setting rack. An overflow means is provided, together with a circuit which includes a plurality of switches, the purpose of this portion of the apparatus being to discontinue further operation of the pin feeding and conveying means after charge of all of the pin receiving members and accumulation of pins in storage between the primary pin conveying means and the pin receiving members. A sweep mechanism is provided which clears the alley and gutters after the delivery of each ball and initiates the operation of the setting rack. Electrical control and operating means are also provided which control the operations of the various mechanisms and automatically function to re-set the entire ten pins when a strike has been made or to re-set after action of the sweep those pins which were left standing where less than the entire number are knocked down by the first ball delivered.

The above and other objects and apparatus will be more fully apparent as set forth and described in the following specification and illustrated in the accompanying drawings.

I have described and shown respectively one embodiment of my invention.

Fig. 1 is a side elevation at the pin end of a bowling alley illustrating my invention as applied thereto, a portion of the side wall and alley being broken away for convenience.

Fig. 2 is a plan view of the same, with a portion of the upper roller and pin conveying means broken away.

Fig. 3 is a vertical section taken along the line 3—3 of Fig. 1.

Fig. 4 is a similar section along the irregular line 4—4 of Fig. 1.

Fig. 5 is a vertical section along the line 5—5 of Fig. 3.

Fig. 6 is a horizontal section along the irregular line 6—6 of Fig. 1.

Fig. 7 is a vertical section along the irregular line 7—7 of Fig. 1.

Fig. 8 is a detail view partially in section illustrating a portion of the mechanism and showing the sweep and its actuating means in a position approaching its limit of sweeping movement.

Fig. 9 is a horizontal section through a portion of my apparatus illustrating the action of the ball discharging means.

Fig. 10 is a section along the irregular line 10—10 of Fig. 7.

Fig. 11 is a vertical section through a portion of the pin control mechanism.

Fig. 12 is a vertical section along the irregular line 12—12 of Fig. 10.

Fig. 13 is a vertical section along the line 13—13 of Fig. 2, similarly along the line 13—13 of Fig. 4.

Fig. 14 is a vertical section along the line 14—14 of Fig. 2.

Fig. 15 is a vertical section along the line 15—15 of Fig. 14.

Fig. 16 is a section along the line 16—16 of Fig. 14 and drawn to a larger scale.

Fig. 17 is a section along the line 17—17 of Fig. 16.

Fig. 18 is a section along the line 18—18 of Fig. 4.

Fig. 19 is a detail elevation of the ball-lift mechanism, a portion thereof being broken away for illustrative purposes.

Fig. 20 is a vertical section along the irregular line 20—20 of Fig. 19.

Fig. 21 is a longitudinal section through a plunger actuated switch, the contact plungers being illustrated in elevation.

Fig. 22 is a detail showing one of the sweep actuated switches, portions thereof being broken away for illustrative purposes.

Fig. 26 is a wiring diagram of the electrical controls, circuits and actuating means.

Fig. 27 is a development of the switch drums illustrating a relative positioning of the contacts.

Fig. 28 is a wiring diagram of the pin feed check means.

Fig. 29 is a wiring diagram of the ball lift and return means.

Fig. 30 is an elevation of the foul line indicator and a diagram of the circuit associated therewith.

Fig. 31 is a vertical section through a portion of the pin setting rack along the line 31—31 of Fig. 32.

Fig. 32 is a plan view of the structure shown at Fig. 31, the bowling pin being removed for convenience.

Fig. 33 is a section similar to that of Fig. 31 showing the setting rack in the act of depositing a pin upon the alley.

Like numerals refer to like elements throughout the drawings.

Figure 23:
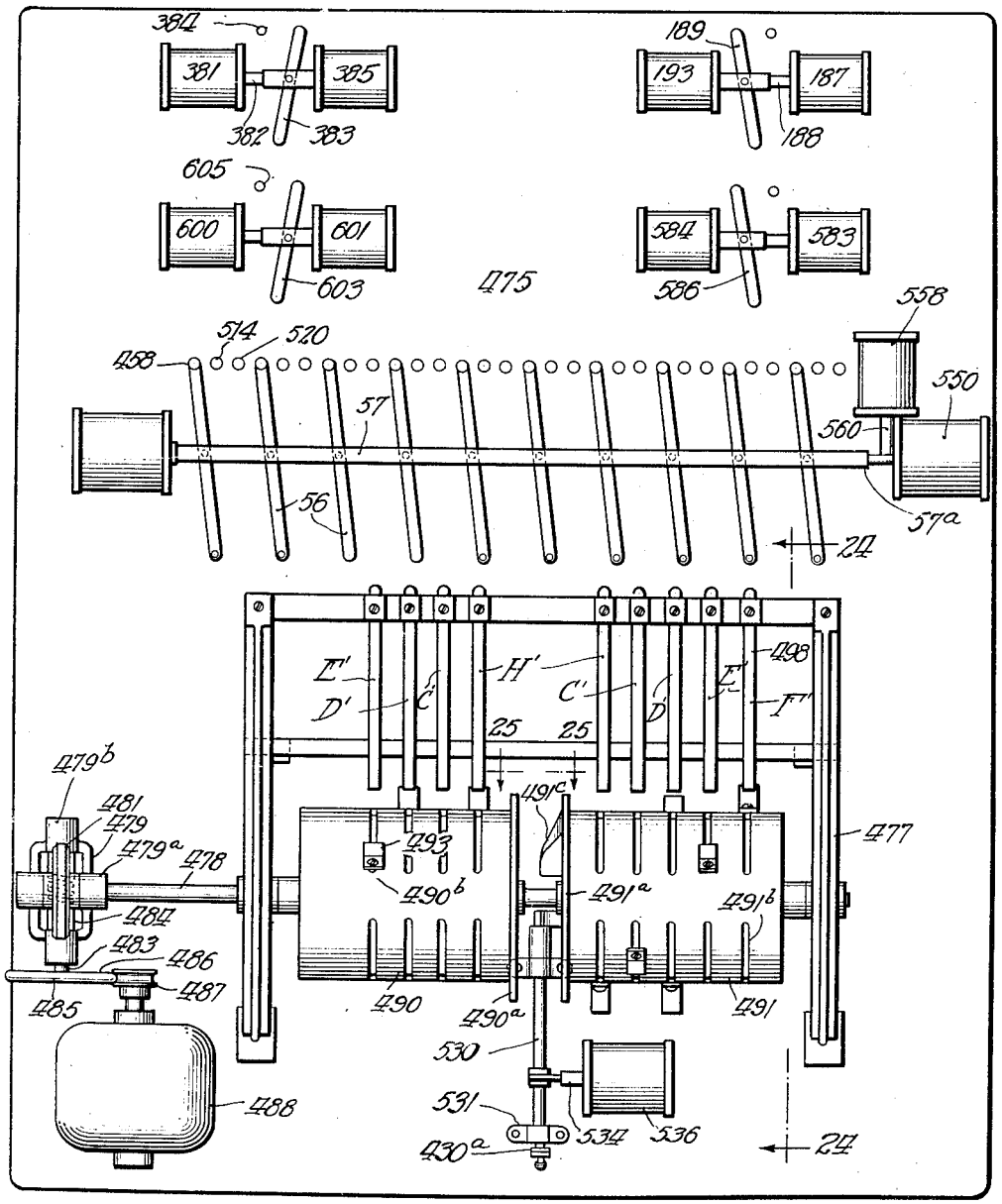
Fig. 23 is an elevation showing in a partially diagrammatic manner the switch actuating drums and other electrical controlling apparatus.
Figure 25:
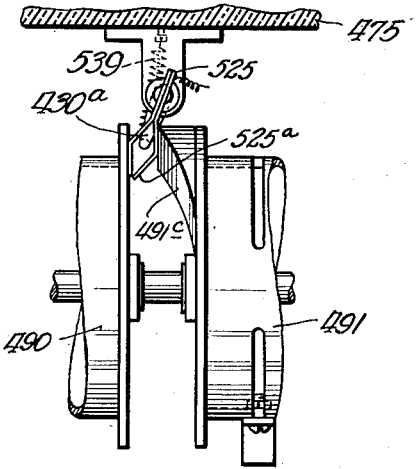
Fig. 25 is a section along the line 25—25 of Fig. 23.
Figure 24:
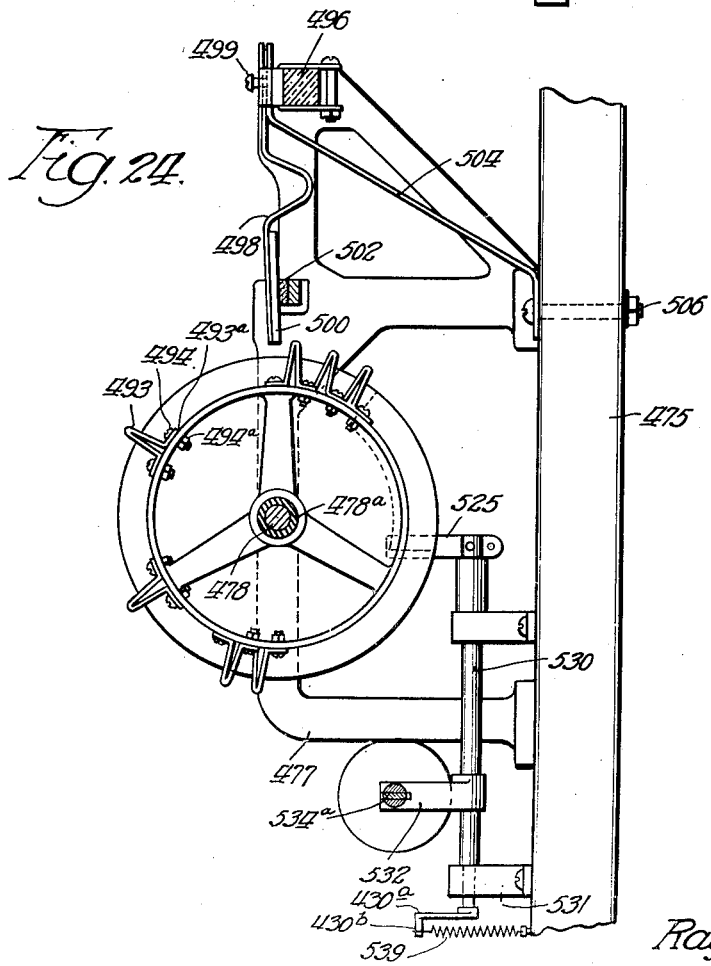
Fig. 24 is a vertical section along the line 24—24 of Fig. 23.

In the game of ten-pins the game is divided into ten "frames", an arbitrary term representing ten turns for each player. If all of the pins are knocked down on the first ball delivered in a frame that is termed a "strike" and the bowling for that frame is terminated although the scoring in that frame is not completed until the player has delivered two more balls in his next one or two turns. If only some of the pins are knocked down on the first ball in a frame the player is permitted to deliver a second ball. If the remaining pins are all knocked down on the second ball the player has made what is termed a "spare" and the scoring for that frame is not completed until the delivery of one more ball by the player in his next turn. At the end of the ten frames the player is permitted to immediately deliver one or two balls more if he has made a "spare" or a "strike" respectively in his last frame. My apparatus is designed to take care of the pin resetting to meet the conditions of the game as outlined above.

In the drawings 50 indicates the alley (see Fig. 3), the same being generally constructed of a plurality of longitudinally arranged strips of hard wood, smoothed and leveled and highly finished to present no obstruction or interference to the normal travel of the ball from the front end of the alley. Gutters 50—a are located at each side of the alley 50 in well known manner.

At the rear or "pin" end of the alley are provided ten spots in pyramidal relation (see Fig. 26), these spots being generally indicated in the drawings by numeral 52 (see Fig. 3) and being numbered from 1 to 10 in accord with the numbering used in identifying the pins in the game as illustrated in Fig. 26. At each of the "spots" is imbedded in the alley a pair of spaced contacts 53—a, 53—b (see Figs. 1, 26), each of these contacts being included in a circuit which also includes a conductor 54 for each of the spots, which conductors 54 each lead to the post of a switch arm 56 (see Fig. 26), one being provided for each of the spot circuits and being numbered on the drawings for separate identification as 1' to 10' respectively. All of the switch arms are pivotally attached to a slide or bar 57 and each is provided with a switch point movable into and out of contact with either of three contacts described below. This bar 57 and the switch arms 56 constitute a gang switch, the purpose and action of which will be described later.

There is provided a plurality of bowling pins 60 of conventional construction, in the base of each of which is secured a metal ring or plate 56—a (see Figs. 1 and 10), which ring or plate 56—a is of conductive metal and arranged to bridge the gap between the spot contacts 53—a, 53—b, when the pin is on such spot, thereby completing the continuity of the corresponding conductor 54 as will be obvious.

*Receiving and classifying table*

At the rear end of and beyond the alley is provided what is termed the pit 61 which I believe it desirable to extend beneath the pin end of the alley as best illustrated in Fig. 5 for example. Suitable metal frame work, including bars 62, uprights 63, and the like are utilized in conjunction with the base or foundation 65 to support the pin end of the alley in rigid position.

Also supported upon the foundation 65 in the pit is the supporting plate 67 having a central boss 67—a, an aperture to provide a bearing for the vertically mounted shaft 69 (see Fig. 5). A circular flange or wall 67—b also extends upwardly from the plate 67 and is grooved on its upper face to furnish a raceway for bearing balls 70. An additional outwardly located and spaced circular rib 67—d also projects upwardly from the plate 67 and suitable reinforcing flanges 67—e extend between the wall 67—b and the flange 67—d to insure sufficient strength and rigidity to the plate 67.

Secured to and rotatable with the shaft 69 is the table generally indicated by numeral 72, the same being of circular contour and preferably provided with a covering 73 of rubber, cloth or the like for sound deadening and impact lessening purposes. On the upper face of the table 72 at the outer edge is provided a plurality of spaced ribs or flanges 72—a. A spiral deflector 75 is provided, the same having an enlarged boss 75—a at one end which is apertured to easily fit over the upper end of shaft 69 and to contain a bushing 77, which loosely fits over the upper end of the shaft 69 (see Fig. 5). At its other end the member 75 is fastened by a bolt 80 or the like to the inner end of a guide arm 81 which overlies the outer portion of the table 72 and is elevated there above sufficiently to permit entrance of the rib 72—a there beneath (see Figs. 5 and 6).

The spiral deflector 75 lies closely adjacent to the upper surface of the table 72. A considerable portion of the deflector 75 lies adjacent the inner edges of the ribs or flanges 72—a which form pockets, each for the reception of a single pin or ball. As illustrated in Fig. 6 a pin having been urged or deflected into one of the pockets will be maintained therein by the deflector 75 until discharged from the table 72 and the entrance of another pin or ball will be prevented, thus insuring proper spacing or separation of the pins and balls prior to discharge from the table.

Depending from the under side of the table beyond the rib 67—d are the pins 82 located in spaced relation. Surrounding the table 72 is the guard rail 85 which projects upwardly above the plane of the table (see Fig. 3) and serves to retain the balls and pins upon the table until they are delivered to their respective receiving and disposing mechanism.

Secured to the guard rail 85 or other suitable location and projecting inwardly over the outer portion of the table 72 is a second guide arm 87 also sufficiently spaced from the table 72 to clear the ribs 72—a. A cross partition 89 extends across the pit between the side walls 90 and 91 thereof at the front end of the table, this partition extending down to the guard rail 85 and being provided with a cut-out portion or entrance 89—a through which slightly projects the inner end of the guide arm 87 as illustrated in Fig. 6.

In front of the plate 67 is provided a pedestal bearing 93 and in alignment therewith and secured to one of the supporting bars 62 is a bracket bearing 94. A rotatable shaft 96 extends between and is included in these two bearings. Secured to this shaft intermediate its extremities is a kicker arm 98 having similarly formed portions projecting to either side of the shaft 96, and located in the path of travel of the bowling balls but not of the pins. The wall 85 is partially cut away to accommodate this kicker and still present a barrier to passage of pins into the ball discharge way (see Fig. 3). Each of these portions is concaved or dished at 98—a to, at least partially, conform to the outer contour of a bowling ball. Also secured to and rotatable with the shaft is a trip arm 100 having similarly formed curved portions projecting to either side of the shaft. A pair of crossed actuator arms 101 are provided, each projecting a substantial distance beyond the shaft 96 at either side thereof, these arms intersecting to form included angles of less and more than 90 degrees. Overlying the guard rail 85 and the incline downwardly thereto from the walls of the pit is the inclined partition 103 to insure that all of the pins and balls delivered in the pit will fall upon the rotating table 72.

In an edge of the cut-out portion of guard rail 85 is provided a spring urged yielding detent 105 in the orbit of the kicker arm 98, each end of which is provided with a slight pocket or recess 98—b for yielding engagement with said detent. Leading from the door or recess in the cross partition 89 and the corresponding interruption in the guard rail 85 is a trackway 108 having the guard flange 108—a at one side and being downwardly inclined for travel of a ball deposited thereon under the action of gravity.

At a point spaced from the point of discharge of the ball from the table the guard rail 85 is interrupted as is the rear wall to provide a pin passageway 110 leading to a chute 111 in which is provided a lift conveyor described below. The guide arm 81 extends across and outwardly of the passageway 110 (see Fig. 5) and, as stated, into alignment with the outer end of the deflector 75.

*Operation of the ball discharge*

After the delivery of a ball, as will be described later, those of the pins which have not fallen into the pit are swept there into and the table 72 carrying the pins and ball rotates with its load, the deflector 75 urging the pins to the outer periphery of the table against the guard rail and into the pockets formed by the spaced ribs 72—a. Similarly the ball indicated by numeral 115 urged by the deflector 75 and under the influence of centrifugal force will find its way into one of these pockets unless a pin is occupying the same, in which event it will not be discharged but will be kicked out of the pocket by the tapered end 87—a of the guide arm 87. When the ball, however, does obtain a pocket as indicated in Fig. 6 during the rotation of the table, it will strike the trip arm 100 and move the kicker arm 98 out of its detention by the detent 105. At the same time one end of one of the arms 101 is moved into the path or orbit of the pins 82 and thereafter the shaft 96 is rotated by the engagement between one of the pins and the striker arm 101. During this rotation the concaved kicker arm 98 will move the ball against the guide arm 87 and together they will deflect it and direct it through the entrance 89—a out of the trackway 108, which it will roll down under the influence of gravity. As the actuated striker arm 101 is moved around it finally arrives at a position wherein the pin will ride by and the other end of the kicker arm 98 will be engaged by the detent 105 and the ball-discharge apparatus will come to rest until the arrival of another ball. The trip arm 100 being located above the zone of travel of the pins. The arms 101 are so arranged that as actuation of one end of one of them is discontinued the end of the other one will not ride into the path of the actuating pins 82.

*Pin discharging operation*

As the table 72 rotates the pins are urged toward the outer periphery thereof into the pockets between the ribs 72—a under the influence of the stationary spiral deflector 75 (see Fig. 6). Pins carried in the pockets will travel with the table until they encounter the guide arm 81, when they will be deflected through the entrance 110 and will roll downwardly into the chute 111 under the influence of gravity.

*Ball return mechanism*

The trackway 108 leads to a chute 117. The back wall 119 of the chute is channeled (see Figs. 2 and 19 for example) and in this channel is mounted a slide 120 having a ball receiving shelf 121 at the bottom in alignment with the lower end of trackway 108 when at rest. Secured to the back wall 119 or other suitable location is a bracket 123 upon which is supported an electric motor 124 connected by belt or other suitable means 125 with a speed reducing mechanism 127 of any suitable construction from which projects the shaft 128 carrying the pinion 129 and projecting slightly there beyond as indicated by number 128—a (see Figs. 19 and 20). An elongated internal continuous rack 131 is provided, the same having a continuous series of teeth 131—a and a continuous groove 131—b located within and paralleling the pitch line of the teeth 131—a. The projecting end 128—a of the shaft 128 rides in the groove 131—b. At its lower end the rack 131 is pivotally attached to the link-arm 133 which at its other end is pivotally attached to a U-shaped attachment member 134 carried by the slide 120.

It will be apparent that starting from rest position as indicated in Figs. 19, 20, when the motor 124 is actuated pinion 129 will elevate the rack 131 raising the shelf 121 and the ball 115 thereon. The ball is retained on the shelf 121 during this lift by the front wall 135 of the chute 117, which wall terminates at the return trackway 136 which leads to the front end of the alley. When the shelf 121 has reached the position indicated in dotted lines in Fig. 19 the ball 115 will roll therefrom out of the trackway 136 and be returned by the action of gravity to the front end of the alley. The pinion 129 being kept in mesh with the rack by the groove 131—b will move the slide transversely as the end is reached to mesh with the opposite side of the rack to effect the return movement of the ball lift.

At one side of the rear wall 119 is mounted a switch member 137 comprising the spring contact arm 137—a and the fixed contact 137—b, the switch 137 being normally open. Current wires 140 are in circuit with the switch 137 and with magnet 141 having solenoid plunger 142 operably attached to a switch arm 143 (see Fig. 29). A second oppositely working magnet 144 also is arranged to actuate the solenoid plunger in the opposite direction. A switch contact 143—a is located adjacent the arm 143 in circuit with the motor 124 and a source of current 146.

The shelf 121 carries an outwardly projecting pin 121—a which will contact the spring switch arm 137—a in its movement up and down in the chute 117. On the upward movement from rest it will merely deflect the arm 137—a, leaving the circuit open. On the down movement, however, it will contact the arm 137 and close the circuit through the solenoid magnet 141, moving the switch arm 143 to position shown in Fig. 29, i. e. circuit opening position, whereupon the circuit through the motor 124 will be opened and the slide 120 will ride to rest under its momentum.

Mounted in the front wall 135 of the chute 117 is a hinged flap 135—a. Projecting through an aperture, 135—b, in the wall 135 is a small plunger 150, urged against the flap 135—a by the spring 150—a. A contact 151 is in alignment with the plunger 150 and in circuit with the conductor 152 which is included in the circuit with solenoid magnet 144. The arrangement is such that when the ball 115 is delivered upon the shelf 121 plunger 150 will be moved into circuit closing position as illustrated in Fig. 19 and the magnet 144 will be excited to move switch 143 into circuit closing position whereupon the motor 124 will be thrown into circuit with the source of current and the ball will be elevated as previously described.

It will be apparent that this ball lift and return means may be utilized to serve two adjacent alleys, it being customary in present day alley construction to locate a ball return trackway between each each pair of adjacent alleys.

In order to guard against a ball being delivered into the chute 117 when the shelf 121 is out of ball-receiving position, I provide a pair of spaced arms 122 pivotally mounted on spindle rod 122—a extending through the rear wall 119. Carried between the arms 122 at their rear portion is a counterweight 122—b and at the forward ends of the arms which project well into the chute 117 I provide a cross rod 122—c underlying the shelf 121. A stop pin 122—d projects from the outer side of the back wall 119. It will be apparent that when the shelf is in ball-receiving position as indicated in Fig. 19 for example, the arms 122 will be tilted as shown out of the path of the ball. When the shelf has been lifted, however, counterweight 122—b will tilt the arms 122 to block ingress of a ball from either side into the chute 117.

*Pin conveying and distributing means*

The chute 111 is provided with side walls 111—a and a front wall 111—b (see Figs. 5 and 6), the latter being interrupted at the entrance 110 to permit the pins to roll into the chute. Located adjacent the chute are a pair of spaced horizontal shafts, the lower designated by numeral 155 and the upper by numeral 156. The lower shaft 155 is journaled in the spaced bearings 155—a (see Fig. 6) and the upper shaft 156 is journaled in the spaced upper bearings 156—a (see Fig. 2). On each of these shafts is mounted a drum 160 and mounted upon and extending between such drums is a plurality of spaced belt sections 161, such sections being provided in lieu of a single belt to provide gaps or spaces 161—a there between. At intervals upon the outer surface of the belts 161 are the transverse bracket members 163 slightly curved to afford a concave pocket for the pins. Small lugs 163—a project from the outer edge of the brackets 163 to further assist in retaining the pins thereon.

Preferably located adjacent the pit on a suitable shelf or stand 165 is a motor 166 which through the medium of belt 167 and pulley 167—a rotates the driven shaft 169 of a speed reducing mechanism 170 (see Figs. 1 and 6). A driving shaft 170—a projects from one side of the speed reducing device 170 and carries a sprocket 170—b on the end thereof which serves through the medium of chain 173 to drive pulley 174 and shaft 175 underlying the table. This shaft is suitably journaled in the spaced bearings 176 and carries at its opposite end a beveled pinion 178 meshing with a beveled gear 179 secured to the under side of the table 72. This last described mechanism serves to rotate the table when motor 166 is operating.

On the opposite side of the speed reducer 170 also protrudes a shaft which may be an extension of shaft 170—a on which is mounted a driving sprocket 170—d which through the medium of the chain 181 drives sprocket 182 on drum shaft 155 thereby serving to move the belt 161 in the direction of the arrow at the top of Fig. 1 for example.

Associated with motor 166 is the contact switch 183 (see Figs. 4 and 21). This switch is in circuit with the conductor 184, one branch of which leads to a source of power 180. Also included in circuit with this switch 183 is a solenoid magnet 187, the plunger 188 of which is operably attached to a switch arm 189 movable into and out of contact with terminal 189—a.

In the rear of the pit hangs a padded bumper or false wall 190 swingably mounted at 191 on cross bar 192. This bumper is arranged and designed to receive the impact of pins or ball or both in bowling and when at rest lies slightly in advance of the protruding spring extended switch contact 183—a of switch 183. Under impact of a ball or pin the bumper member will contact and move the contact 183—a to temporarily close switch 183 exciting magnet 187 which through its action upon the plunger 188 will move the switch arm 189 into circuit closing position thereby closing the circuit through the motor 166 which will then function as described to rotate the table 72 and to actuate the pin conveying belts 161.

Suitable switch 183 is illustrated in Fig. 21. A fixed cylinder 183—b is provided having the eccentrically located chamber 183—c formed by the thickened side 183—d, which is grooved at 183—e to accommodate the sliding plate 184 upon which is mounted a plunger 185. Extending across the plunger 185 is the insulating partition 185—a in which is slidably mounted the pin 183—a which also slides in the threaded insulating bushing 185—b in the plunger end 185—c. The coiled spring 185—d extends between the partition 185—a and a collar 186 on the pin 183—a, serving to normally and yieldingly maintain the same in outwardly extended position. Slidingly mounted in the rear end 183—f of the cylinder 183—b is a second rod 183—g having spaced collars 183—l engaging the forward end 185—e of plunger 185. The rod 183—g is formed with the outer headed end 183—i, and a coiled spring 183—j extends between the cylinder end 183—f and one of the collars 183—l, this spring functioning to normally maintain the parts in the position illustrated with the plunger 185 protruded from the cylinder 183—b. In this position the inner ends of the pin 183—a and the rod 183—g are located in spaced relation, wires 183—h are secured to these spaced ends extending through an insulating eyelet 185—h at plunger 185, the cylinder 183—b being slotted at 183—k to permit free movement of such eyelet. When the bumper 190 is forced against the pin 183—a the pin will be moved until it contacts with the rod 183—g closing the circuit through the conductor 184. Further movement is permitted until movement of the bumper ceases, this by telescopic arrangement of the plunger 185 and cylinder 183—b, as will be obvious.

A cross bar 198 extends across the rear face of the front run of the belts 161 slightly out of contact therewith (see Fig. 2) and just under the upper drum 160 project a pair of cam flanges 199 (see Figs. 2 and 15 for example). This projection of the cam flanges is permitted by the gaps between the belt sections 161. The brackets 163 are slotted at 163—b to clear the flanges 199 in their passage thereby as shown in Fig. 2. Opposite the flanges in the front wall 111—b of the chute is a discharge opening 111—d (see Fig. 15) through which the pins are forcibly discharged by contact with the inclined lower edge of the cam flanges 199.

An inclined trackway 200 is located at the upper portion of the front wall 111—b as illustrated in Figs. 14 to 16, the same being provided with a centrally cut out portion narrower than the maximum width of the pins in the greater portion of its length as indicated by numeral 200—a and enlarged at one end to conform to the contour of the pin and permit the passage there through as indicated at 200—b. The small shelf 201 extends from the upper portion of the trackway 200 across the lower portion of the opening 111—d, the same being provided with a guard flange 201—a at one end and being slightly recessed or cut away at its front edge as indicated at 201—b (see Figs. 2, 14 and 15). Hingedly mounted on pedestal 203 which extends across the upper portion of the gap 200—a is a block 204 carrying the loop 205 slightly curved at its forward end to normally lie in the gap 200—a. The track 200 is angularly formed or curved as illustrated in Fig. 16 in order to change the axial position of the pins prior to their discharge from the trackway. A coiled tension spring 207 has one end secured to the block 204 and its other end to a flange 200—c at the upper end of the track 200 (see Figs. 2, 14 and 15). This spring serves to yieldingly hold block 204 and loop 205 above the plane of the trackway 200 as indicated in dotted lines in Fig. 14.

In the operation of the table and pin conveying means I find a large number at least of the pins are delivered to the conveyor in the position indicated in Fig. 6 for example, but I find it desirable to provide for re-position of pins reversely placed on the conveyor in order that the balance of the apparatus may properly function in the re-setting of the pins. As the pins are kicked or discharged over the shelf 201, if they are in the position of the pin shown in full lines in Fig. 14, the loop 205 will quickly drop into the plane of the track 201 and the pin will drop there down to the bottom thereof without shift of its ends. Should a pin be reversely delivered upon the loop 205, however, the small end or neck will drop through the loop 205 into the position illustrated in dotted lines in Fig. 14 and the rotative momentum of the pin will reverse it to the full line position indicated in Fig. 14.

Along the rear edge and the lower end of the trackway 200 is provided a guard flange 200—d restraining and guiding the pins in their successive movement down the trackway. A slide plate 210 is slidably mounted on the under surface of the track 200 as indicated in Figs. 14 and 16. This plate 210 is provided with a curved forward edge 210—a which normally projects partially into the enlarged opening 200—b in the trackway 200, a sufficient amount to prevent dropping of a pin there through as illustrated in Fig. 14. Lever 211 is pivoted intermediate its extremities at 211—a to the plate 210 and is pivoted at one end to a fixed angle at 212 secured to the slide. The other end of the lever 211 is pivotally attached at 211—b to the reciprocable rod 214 guided by the bracket bearing 215 secured to one side of the trackway 200. Located beneath the trackway 200 is a pivoted striker arm 217 pivotally attached to the bracket 218 on one side of the lower door plate 219. The striker arm 218 is offset intermediate its extremities and extends through a suitable aperture 219—a in the board or wall 219. A coiled spring 220 has one end fixedly secured to the wall 219 and the other end to the striker arm 217 as illustrated for example in Fig. 16. Underlying the trackway 200 is a trough having its front wall formed of the board or wall 219. A bottom plate 225 is provided and the latter is channeled to provide a trackway for spaced conveyor chains 226 (see Figs. 14, 17 and 18). A shoulder 227 is provided at one side of the trough for the butt end of the pins to ride upon and a similar shoulder 228 is provided at the opposite side for support of another portion of the pins, these shoulders being preferably so arranged as to support the pins at points of substantially equal circumference to obtain a possible uniform rolling movement of the pins in their passage through the trough. A pedestal 230 extends upwardly from cross bar 192 and supports the lower end of the trough just described, the upper end being suitably supported upon rigid angle members 232 (see Fig. 4).

Chains 226 are mounted upon and rotate with the sprockets 234, 235 carried upon shafts 236 and 237, respectively. At properly spaced intervals upon the chains are provided outwardly projecting cleats 239, the cleats being arranged in aligned pairs as illustrated. The inner end of striker arm 217 projects into the path of travel of the cleats carried upon one of the chains and it will be apparent that as the arm is actuated by the pin in its passage the slide plate 210 will be retracted from the position shown in Fig. 16 and the pin at the lower part of the track 200 will be released to drop on to the chains in the spaces between pairs of cleats on each of the chains, which cleats will serve to straighten up or square the pins into an axial position at right angles to the direction of travel. The chains and their cleats thus serve to convey the pins up through the chute within which they ride.

At the upper end of travel of the conveyor formed by the chains 226 the pins as illustrated in Fig. 4 roll over into a longitudinally arranged trough generally indicated by numeral 238 (see Figs. 2 and 13). This trough is formed with a bottom 240, outer wall 241 and inner wall 242. At the upper end extending across between the outer and inner walls of the trough is a supporting shelf 244. The trough is inclined downwardly and intermediate the extremities thereof is provided a tip-up 245 formed of the angular flaps 245—a, 245—b. Flap 245—b is bifurcated by the recess 245—c (see Figs. 4 and 13).

Underlying the flap 245 is a spring switch 251 having a spring extended plunger 252. With a pin lying upon flap 245—a the plunger 252 will be depressed to close switch 251 which is in circuit with conductor 254 (see Fig. 28). This circuit also includes the solenoid magnet 255, meeting the co-acting plunger 256 which is connected through strap 257 (see Fig. 13) to the pivoted arm 259 carrying the stop bar 260. When the magnet 255 is unexcited the shoulder 260 will lie in full line position as illustrated in Fig. 13 and the pin lying upon the plate 245—a of the tip-up will be restrained by contact of its base with the shoulder 260 from further movement down the chute 238. The head of such pin will project into the recess 245—c of the other portion of the tip-up, thus permitting the pin to lie in non-jamming position beneath the cross strip 261 of the chute.

Pin accumulating mechanism

When pins are permitted to pass through the chute 238, which passage must be step by step due to the action of the tip-up, they will be delivered singly on to a concave shelf 265, at the upper end of an inclined passageway formed by pin receiving members. A fixed partition 267 overlies this passageway. The partition 267 is provided with a down projecting shoulder or flange 267—a at the upper end (see Figs. 7 and 13) against which the pins sliding through the chute 238 will impinge, insuring their proper position on the shelf 265 prior to feed into and through the accumulator. Overlying the shelf 265 at the outer portion thereof is a rotatable rod 269 suitably journaled in the partition 267 and in the supporting bracket 270. This rod is provided with a flap or wing 271 at its lower end and a coiled torsion spring 272 surrounds the upper portion thereof to resist rotative movement from normal or rest position. At its uppermost end the rod 269 projects through bracket 270 and carries an angular projecting switch arm 276 (see Fig. 2 for example) having the contact 276—a to which is connected the conductor 254. The post 278 also projects upwardly from base 275 carrying the complementary contact 276—b to which another portion of the conductor 254 is connected.

The arrangement of these parts is such that when a pin is delivered on to the shelf 265 it will contact with the wing 271 and partially rotate the rod 269 and the arm 276 to break the circuit through the conductor 254 as illustrated in Fig. 13.

The passageway referred to above is formed by a series of pin receiving pocket members 280 (see Figs. 7 and 10 to 12 for example), each formed with an upper table portion 280—a having a pin receiving recess 280—b therein and with a front wall 280—c. A substantially triangular flange 280—d is located at one side of each of these members 280 and extends between the wall 280—c and the table portion 280—a. Located within each of the members 280 at the open side thereof is a supporting plate 282, these plates all being mounted upon the supporting shelf 284 which has a downwardly depending front flange 284—a and a rearwardly inclined, upwardly extending flange 284—b, this latter flange being scalloped to provide the concavities 284—c as shown in Figs. 7 and 10 for example. A boss or hub 280—e is formed upon each flange 280—d, being centrally apertured to accommodate the shaft 287, at each end of which is provided an anti-friction roller 287—a. These rollers are mounted in suitable recesses in the supporting plates 282 (see Fig. 12). The construction of the members 280 and the location of their axis and pivotal movement is such that without a pin thereon the mass of the member itself will act to tilt or rotate the member in a clockwise direction. With a pin thereon, however, as indicated in Fig. 10 the center of mass is shifted to the right of the pivotal axis and the effect is to urge the member to tilt or rotate in a clockwise direction to discharge the superposed pin. To normally prevent such tilting movement each of the members 280 is provided with a detent 290 pivoted at one end at 290—a or between a slotted strip 291 which extends between the front and rear of a trough-like casing 292. A solenoid magnet 293 is provided for each of the detents 290, these magnets being located in the trough 292 and each provided with a spring extended solenoid plunger 294 pivoted to one of the detents 290 intermediate its extremities. Each detent 290 is provided with a downwardly extending tip 290—b at its free end, a stop pin 290—c extending therethrough to engage the under side of the strip 291 to limit the spring urged outward movement of the detent. When in outward position the free end of the detent 290 will lie behind the lower edge of the wall 280—c of its member 280 and will prevent tilting or movement thereof when a pin is deposited on it. Resilient cushioning or buffing strips 295 are preferably interposed between the wall 280—c and the bottom of the supporting plate 282 to reduce the shock and noise which would otherwise result from their impact.

Each of the magnets 293 is wrapped with a pair of conductors 296, 297 (see Fig. 26) for purpose hereinafter described, it being sufficient to state here that when either of such conductors is thrown into circuit with a source of current the magnet will be excited and through its attraction upon the plunger 293 the detent 290 will be drawn down, releasing the pocket member 280 permitting it to tilt and discharge the pin therefrom after which the member 280 will reversely rotate or tilt and depress the detent 290 against the action of its spring until it is passed when the spring will move the detent into locking position again.

In the operation of my apparatus those pocket receiving members are actuated to deliver only such pins to the setting rack described below as must be reset upon the alley. Consequently it is necessary and desirable to prevent lateral movement of the pins from those pocket receiving members which are not to be tilted on to or against those which are to be tilted. For this purpose I provide between each pair of members 280 a stop plate 300 pivoted on the stud 301 carried upon the supporting plate 282. Each of these stop plates is provided with a forked arm 300—a engaged by a pin 280—g carried by the corresponding receiving member. An angularly disposed stop arm 300—b forms a part of the plate 300 and is so constructed and arranged that with the members 280 in pin receiving position as illustrated in Fig. 10 the ends of the arms 300—b will permit unobstructed passage of the bowling pins. Upon tilt of any of members 280 from such position, however, the corresponding stop arms 300—b at the upper side of such members will be rotated in position as indicated in dotted lines in Fig. 10, in which position the passage of bowling pins down the passageway or from the untilted receiving members is prevented as will be obvious, it being noted that each guard member 300 is operated by the next lower receiving member 280.

The magnets 293 are separately numbered from 1—a to 10—a, respectively, in the wiring diagram (Fig. 26) to correspond with the spots 1 to 10 (for example magnet 1—a when actuated will release a pin intended for ultimate set upon spot 1).

To obtain step-by-step progress of the pins down the inclined row of pocket receiving members 280, I provide means which includes a pair of vertically reciprocable frames 302, 303. Each of these frames is provided with a series of spaced pairs of fingers 302—a, 303—a for the reciprocation of which suitable apertures are provided in the partition 267 (see Figs. 7 and 10, for example). A pair of upwardly projecting oscillating levers 304 is located at each end of the frames 302, 303, these levers being bifurcated or slotted at 304—a at their ends for engagement with the end cross rods 305, there being such a cross rod extending across between each end of frames 302 and 303. These levers 304 are mounted for oscillation upon pintles or shafts 304—b which are journaled in the U-shaped bracket members 306 supported upon the partition 267. An upwardly projecting crank arm 304—c extends from each of the end cross rods 304—b. Intermediate the brackets 306 is a central upstanding post 307 in which is journaled a pin or shaft 307—a carried by a rocker arm 308 between each end of which and one of the arms 304—c extends a connecting rod 308—a. An angularly formed connecting rod 308—b is slidably supported in a collar which is pivotally attached at 308—c to the rocker arm 308 and at its opposite end rod 308—b is pivotally attached to a rotating disc 308—d, rotatably mounted upon the shaft 308—e also carrying a sprocket 308—f driven by means of the pinion 308—g of speed reducing mechanism 308—h, which in turn is driven from motor 309 by suitable belt 309—a and pulleys 309—b and c as illustrated in Figs. 7 and 10 for example. The sliding connection between rod 308—b and rod 308 provides a lost motion effect which results in an intermittent movement of frames 302 and 303.

The pairs of fingers 302—a alternate with fingers 303—a as illustrated, the space between adjacent pairs of the fingers being substantially equal to the thickness of the body of a bowling pin, and substantially coextensive with the width of a pin receiving pocket member 280. These fingers are preferably constructed of or covered with resilient or flexible material and rounded at their lower extremities for ease of passage between the bowling pins, this construction obviating or lessening damage to the pins and noise of operation.

The frames 302, 303, the fingers carried thereby, and the actuating mechanism are so constructed and arranged that when fingers 302—a are in their lowermost position fingers 303—a will be in their uppermost or pin releasing position. It will be obvious that by this arrangement if all of the pin receiving members 280 are in pin receiving position and any of them have discharged their pins, gaps or vacancies will be created and during the reciprocation of the pins 302—a, 303—a, the bowling pins lying above the gaps or vacancies will move step by step down the pin receiving members until all ten of the latter are charged with bowling pins.

The oppositely reciprocating sets of fingers described above not only compel the bowling pins to move down the trackway step by step but true them up with respect to their position upon such trackway so that they are maintained squarely across the trackway and when deposited on their respective receiving members which secures the proper alignment with the guide rods 316.

*Overflow cut-off mechanism*

At the upper end of trough 238 at the outer side thereof is a chute generally indicated by numeral 298 (see Figs. 2 and 4) so arranged that when the trough 238 is fully charged with pins as illustrated in Fig. 13 additional pins carried thereto by the pin conveying mechanism will be discharged into the chute 298 which leads downwardly to a point overlying the pit. Pins travelling through the chute 298 will thus be returned to the pit and delivered upon the table for re-circulation. In one wall of the chute 298 is a flap or wing 298—a normally protruding into the chute under the action of a spring or the like as illustrated in Fig. 4. This wing carries at the outer side of the shaft an angularly disposed switch arm 298—b carrying a contact movable into contact with a second fixed terminal at 298—c carried by the bracket 298—d. The contact of switch arm 298—b and terminal 298—c are in circuit with the conductor 299 (see Fig. 26) which is wound around solenoid magnet 193 with which co-acts the solenoid plunger 188 previously described.

In the lower face of the partition 267 are provided a plurality of normally open spring extended switch arms 267—x (see Figs. 7 and 26), also in circuit with the conductor 299.

The purpose of these switches and the circuit including them is to open the circuit, including the motors for the turn table and the pin feeding mechanism when and only when the pin receiving members 280 are each charged with a pin and when the through 238, with shelf 265, is fully charged, which necessarily requires that the upwardly moving portion of the pin conveyor is charged insofar as there are pins available for its charge. The normally open switch arms 267—x and the normally open overflow switch arm 298—b insure the maintenance of the table and pin conveying motor circuits in open condition until the charging described is effected.

*Pin setting rack*

I have indicated generally the pin charging rack by numeral 310 (see Figs. 1, 2 and 31 to 33 for example). The setting rack itself may be of any suitable construction. In the drawings I have illustrated one embodiment of such a rack suitable for use in combination with the other mechanisms disclosed.

The rack comprises a main frame 311 having a plurality of suitable pin receiving shelves 312 therein with which co-act opposed vertical flanges 314 having beaded or flanged upper edges 314—a. The shelves 312 and flanges 314 define a species of pocket having a bottom aperture 314—b surrounded by the base 314—c which carries the flanges 314. A pair of spaced rods 316 leads to each of these pockets as illustrated for example in Fig. 11, these rods being carried by the frame 311 and each pair being provided with a cap plate 318 at their upper extremities arranged to lie adjacent the flange 284—b of the accumulator mechanism and being similarly recessed or scalloped at 318—a to conform thereto (see Fig. 11). Overlying each pair of track rods 316 and spaced therefrom is a curved guide of fibre or other suitable material indicated by numeral 317, the same insuring retention of the pin on the trackway.

As a pin is discharged from its receiving pocket member 280 it will slide down its trackway into its pocket in the charging rack. The momentum of the pin will carry it into inclined position resting upon the shelf 312 and restrained from tilting by the flange 314—a as illustrated in Fig. 31 for example.

Depending from each base 314—b are a pair of aprons 319 pivotally attached to such base and recessed or concaved on their inner faces. These apron members 319 are rounded to form cam portions 319—b on their outer faces. A spaced frame member 320 is carried by the main frame 311 and secured thereto in spaced relation by means of the posts 321. Projecting downwardly from the secondary frame 320 is a plurality of legs 322 cushioned or constructed of resilient material to cushion the impact upon the alley when the pins are set. The auxiliary frame 320 is provided with a plurality of openings 320—a through which extend the lower ends of the aprons 319. These openings and the aprons are of such size and construction that when the aprons are reciprocated relative to the auxiliary frame 320 from the position shown in Fig. 31 to that shown in Fig. 33, the auxiliary frame 320 will contract or bring toward each other the aprons 319 of each pair into such position that a pin may not pass completely therebetween. When in the relation illustrated in Fig. 31 a clear passage between the aprons 319 is provided for the pins.

Interposed between the main and auxiliary frames is a movable frame 325 which carries and supports the bases 314—b and their associated flanges 314 and which is slidable on posts 321. A plurality of supporting rods 327 lead from and are secured to the intermediate frame. These rods are secured at their upper ends to the plate 329, to which is secured a supporting cable 330 running over pulleys 331, 332, to a counterweight 333 slidably mounted on the guide rods 334 fixed at top and bottom in suitable securing means. A pin 336 is carried by the head of the counterweight 333 and is engaged by the forked end 338—a of the lever 338 which is pivoted at its other end at 338—b to a collar 339 mounted on the supporting frame 340. A rotatable disc 341 is provided having an engaging stud 341—a which is mounted in a slot 338—c in the lever 338 intermediate its extremities (see Figs. 1 and 7). The disc 341 is driven through the medium of speed reduction mechanism 343 by the driven pulley 344 actuated from motor 346 by the belt 347. The setting rack is preferably slightly over-balanced by the counterweight 333 a sufficient amount to insure its normal movement to pin receiving position as illustrated in Fig. 1 for example. To cushion this mechanism on its return movement I provide a plurality of vertical bars 350 mounted in suitable arms 351 carried by the supporting frame 340. These bars 350 are provided with lower ends 350—a of reduced diameter around which are mounted the coiled compression springs 360. Suitable apertures are provided in the main and intermediate frames to accommodate these reduced lower ends 350—a so that when the setting rack is returning to pin receiving position the main frame will be cushioned by impact with the springs 360 and brought to rest without material shock or jar.

Projecting outwardly from the rack is a striker arm 315—a. In the path of movement of this arm is provided a pivoted cap 370 rounded at one outer edge and pivoted at 370—a to a switch arm 371 co-acting with the switch generally indicated by numeral 372 and pivotally carried upon the adjustable bracket 373 mounted on one of the frame members 340. A yielding means (not shown) resists pivotal movement of switch 372. The switch arrangement is similar to that shown in Fig. 22, described below, and is such that on the downward movement of the rack the striker arm 315—a will contact the cap 370 of the normally open switch 372, which cap will yield and permit passage thereby of arm 315—a. On its upward movement, the rack arm 315—a will contact cap 370 and move switch arm into circuit closing position after which switch 372 will yieldingly pivot sufficiently to permit arm 315—a to pass by. This switch is in circuit with branch conductor 380—a which is wound upon a solenoid magnet 381 with which co-acts a plunger 382 operably attached to switch arm 383 which is movable to and from position closing a switch 384 which is also included in circuit with the conductor 380 and the motor 346. A complementary or reverse acting magnet 385 also co-acts with the plunger 382 to close the switch 384, the magnet 381 being provided to open the same and shut off the motor 346 before the setting rack has quite reached its uppermost position.

Pin setting operation

When the pins which are to be re-set upon the alley are released by their respective receiving members 280 they slide down the trackways into position as indicated in Fig. 31 for example. As the motor 346 is actuated the rack will be lowered through the mechanism described above until the posts 322 impact and rest upon the alley. Further movement of the motor will permit the intermediate movable frame 325 to drop relative to the main and secondary frames, which movement as described above will function to move toward each other each pair of aprons 319 contracting the space therebetween. At the same time the beads 314—a of the flanges 314 will pull the bases of the pins downwardly and tilt the pins into the position indicated in Fig. 3 standing upon the proper spots and accurately positioned by the aprons 319.

Return movement of the rack thereafter will first lift the intermediate frame 325 relative to the main frame, permitting opening of the aprons 319, after which the entire rack is lifted and the pins are left standing on the proper spots.

The manner and time of actuation of the pin setting mechanism will be described more fully below. To insure that the shut-off of motor 346 occurs at the proper time to permit the final travel of the pin charging mechanism to impact with the alley the bracket 373 is made adjustable.

Momentum and counterbalance 333 function to complete the return of the charging rack to pin receiving or raised position, its final movement of travel in this direction being cushioned by the springs 360, as described above.

The sweep mechanism

It is desirable to clear the alley 50 and the adjacent gutters 50—a after the delivery of each ball preliminary to the setting or re-setting of the pins.

For this purpose I provide a sweep 400 provided with depending end pieces 400—a which carry small wheels or rollers 401 at their lower edges, these end pieces being arranged to clear the gutters 50—a of any pins or balls which may lodge therein, while the main sweep 400 is clearing pins from the alley 50 (see Figs. 1, 3 and 8). The sweep 400 is connected by rods 403 to a cross bar 405 which extends between and is carried by the arms 406. These arms at their other ends are carried upon rotatable shaft 408 suitably journaled in the brackets 409 carried by the supporting superframe members 340. The crank arm 411 is secured to the shaft 408 and projects therefrom. A connecting arm 413 is pivotally attached to one extremity of the crank arm 411 and at its other extremity to a rotatable disc 415 which is driven through the medium of a speed reducing mechanism generally indicated by numeral 417 (see Fig. 3) this mechanism in turn being actuated by the driven pulley 419 actuated by belt 420 which is in turn driven by the driving pulley 421 of motor 422. The motor 422 and speed reducing mechanism being mounted upon a table member 423 at one side of the alley as illustrated in the drawings. A pair of flexible rods or cables 424 also extend from the sweep 400 to the arms 406, to which they are secured at points intermediate the extremities of such arms.

When the motor 422 is thrown into actuation the arm 406 will be rotated from its normal or inoperative position illustrated in Fig. 1 downwardly toward the position illustrated in Fig. 8, the sweep 400 moving therewith, being limited in its downward movement under action of gravity by the flexible rods or cable 424 to prevent jamming upon the alley. The rollers 401 will ride upon the floor of the gutters 50—a and support the sweep during its sweeping movement to the rear end of the alley, during which movement all pins and balls upon the alley or in the gutters are swept into the pit. I find it advisable to cover the front face of the sweep 400 with carpet or soft material indicated by numeral 425 in order to cushion the impact of the sweep with the pins and balls. As the disc 415 completes a revolution the arm 413 will move the sweep through its sweeping orbit and return it to normal or inoperative position illustrated in Fig. 1. This operation is synchronized with the operation of the pin setting rack so that the latter will not function to deposit the desired pins upon the alley until the sweeping operation is completed.

This result is effected by an arm 427 loosely mounted on shaft 408 and having a rearwardly extending tongue 427—a through which passes an adjusting stud 428 having a co-acting lock nut 429 and engaging a fixed flange 130 carried by the framework (see Figs. 1, 2 and 22). This arm 427 is offset to underlie another arm described below.

The arm 427 is provided with a looped extension 430 at one end in which is pivotally mounted the switch box 431 into which lead the terminals 432—a, 432—b of conductor 432. The formed terminal 432—a is connected to switch arm 433 pivoted in and projecting through one end of box 431, the other terminal 432—b is connected to contact post 432—c. A coiled spring 434 or the like normally maintains arm 433 and post 432—c in separated relation. A cap 436 is pivoted to the end of arm 427 being recessed to accommodate such end. The recess is open at one side and thereover is mounted a leaf spring 436—a yieldingly holding cap 436 in the position shown (see Fig. 22).

A pin 406—a projects from one of the arms 406 in such position as to contact cap 436 in its movement. On the downward movement of the sweep pin 406—a will pivot cap 436 against the action of spring 436—a until it rides by without electrical action. On the return movement of the sweep, however, when cap 436 is struck it cannot yield and switch arm 433 is moved to close the circuit through conductor 432 which excites magnet 385 closing circuit through conductor 380, setting motor 346 in operation which starts the pin setting operation described above.

A second adjustably mounted arm 450 overlies arm 427 and is provided with a switch 451 similar to that at the end of arm 427. The pin 406—a actuates this switch 451 on its up stroke to close a circuit including conductor 453 which is wound on solenoid magnet 601. This produces excitation of such magnet and moves switch arm 603 to open circuit through the sweep motor 422 bringing the sweep to rest. Downward movement of the pin 406—a produces no electrical action of switch 451.

The arms 427, 450 are adjustable as described above to vary the relative times of operation of the start of pin setting motor and of the cut-out for sweep motor.

Indicator apparatus

Associated with the apparatus previously described is an indicator shown in diagrammatic form in Fig. 26, generally indicated by numeral 455. This indicator as illustrated includes a plurality of lamp elements 456 shown as numbered from 1 to 10 in conformity with the corresponding spots 52 on the alley and in consequent conformity with the pins when "spotted" on the alley. Each of the lamp elements 456 is in circuit with a conductor 457, these conductors being arranged in parallel. Each of the conductors 457 leads to a corresponding contact 458 lying in the path of travel of one of the switch arms 56 (see Fig. 26) and the arrangement is such that when the bar or slide 57 is in its normal or rest position as illustrated in Fig. 26 each of the conductors 457 will be thrown into circuit with a corresponding conductor 54 and if a pin be on the spot included in such circuit a complete circuit through the source of current 185 will be established and a corresponding light element 451 will be illuminated. It will thus be seen that with the bar or slide 57 in the position shown in Fig. 26, those lights of the indicator 455 will be illuminated, which correspond to the pins standing upon the spots, and it will be possible to tell at a glance which pins are standing. The indicator may be located at any suitable place, as will be obvious.

Foul alarm

It is well known to those acquainted with bowling that at the delivery end of the alley a black line is placed to mark the beginning of the alley, it being a rule of the game that the penalty is inflicted should the foot of the bowler contact with the alley over the foul line. I provide a depressible strip 460 (see Fig. 30) for a foul line, the same being normally held in uppermost position by means of compression springs 461. The strip 460 is provided with a pair of contacts 462 on its under side beneath which in normally spaced relation are a second pair of complementary contacts 463 in circuit with the conductor 465, a source of current 466 and a solenoid magnet 467 with which co-acts a plunger 468. Over the plunger is mounted a bell or gong 469. The foul strip 460 is either of conducting material and electrically connected to conductor 465, or a conductor may be mounted therein in circuit with the contacts 462. Should a bowler slide across the foul strip 460 it will be depressed moving the contacts 462 into contact with contacts 463 closing the circuit through the solenoid magnet 467 which will actuate the plunger 468 to strike the gong 469. The construction and arrangement is such that the passage of a bowling ball across the foul strip 460 will not depress the latter.

*The controlling apparatus*

Main positive and negative circuit wires, A, B, respectively, are provided in circuit with the source of current 180 (see Fig. 26).

Secured to a suitable wall or panel board 475 in any suitable location is a pair of spaced bracket members 477 in which is journaled in spaced relation to the wall 475 a rotatable shaft 478. At the outer end of the shaft 478 is provided a frame 479 also supported from the back wall 475 and provided with bearings 479—a at its outermost portion, through which extends and in which is journaled the shaft 478. Between the bearings 479—a is provided a worm gear 481 secured to the shaft 478. Located beneath the worm gear 481 and forming a part of the frame 479 is a second pair of bearings 479—b in which is mounted the shaft 483 carrying the worm 484 which meshes with worm gear 481. The pulley 485 is carried by the shaft 483 at one end and is driven by the grooved friction pulley 487 of motor 488.

The shaft 478 carries between the brackets a pair of drums 490 and 491 which rotate with the shaft and are spaced apart thereon as illustrated in Fig. 23, these drums being insulated from the shaft 478 by means of insulating bushings 478—a. Flanges 490—a, 491—a respectively are provided at the adjacent ends of the drums 490 and 491. The drum 491 is provided with a plurality of slots 491—b at its outer periphery, there being five in the embodiment illustrated. There are two sets of these slots in the drum 491, this drum being what I term the "two-cycle" drum as distinguished from drum 490 which I term the "one-cycle" drum. With each set of slots 491—b is associated a set of contact members 493 shown as of inverted V shape construction and outwardly directed base flanges 493—a which are secured by screws 494 and nuts 494—a in adjusted position in the slots 491—b. For convenience I have illustrated a development of the two drums in Fig. 27. The contacts on one set of slots on the drum 491 are lettered for convenience C, D, E and F while those on the other portion of the drum are lettered H, C, D and E, similar letters referring to contacts controlling similar functions. There is but one contact H and one contact F on this drum, the former being utilized to effect the setting of the entire ten pins and the latter to effect a re-setting of those pins which were left standing on the alley after delivery of the first ball of a frame. The arrows at the bottom of Fig. 27 correspond to the contact arms described below.

Drum 490 is provided with one set of four parallel slots 490—b in which are adjustably mounted similarly constructed contacts 493. In the diagram I have lettered the contacts of drum 490 as E, D, C and H, all but the last being for a purpose similar to the correspondingly lettered contacts on drum 491. A cross bar of insulating material 496 extends across between brackets 477 and above the drums and in it are adjustably mounted a plurality of contact arms 498, preferably of resilient metal and secured in adjusted position by means of screws 499. Each of these arms 498 is provided with a block of conductive material 500 at its lower end which lies in the path of one of the contacts 493. A second bar or strip of insulating material 502 underlies bar 496 to limit the return movement of the arms 498 after they have been sprung out of rest position by the contacts 493. A contact strip 504 leads from each of the contact arms 498 to the binding post 506 with which is connected a conductor, which conductors are designated in Fig. 26 as 508, 509, 510, 511, 512. For ease of description and understanding I have lettered contact arms 498 as E′, D′, C′, H′ and F′ to correspond to the contacts E, D, C, H and F respectively upon the drums 490 and 491. The contact arms E′ are in circuit with the conductor 509 (see Fig. 26); the contact arms D′ are in circuit with conductor 512; the contact arms C′ are in circuit with conductor 510; the contact arms H′ are in circuit with conductor 508; and the contact arm F′ is in circuit with the conductor 511.

Adjacent but spaced from each of the contacts 458 and also lying in the path of travel of the switch arms 56 are a plurality of contacts 514, all of which are in circuit with the conductor 516. These contacts 514 represent the second position of the switch arms 46 as will be more fully described below. A third contact 520 is provided adjacent each of the contacts 514 and spaced therefrom in the path of travel of the arms 56. Each of these contacts represents a terminal of the conductors 296, previously described, and is the third position of its corresponding arm 56.

To place one or the other of the drums 490, 491 in a complete electrical circuit I provide a pivoted contact arm 525 (see Figs. 23 to 27 inclusive). This arm is provided with an enlarged head 525—a, movable into contact with one end of either of the drums, being mounted in the gap between. The drums are of conductive material and insulated from the shaft 478 as described above. Arm 525 is electrically connected to conductor 527 which in turn is in circuit with negative wire B. The arm 525 is mounted upon and rotatable in rocker shaft 530 journaled in suitable brackets 531 mounted upon the wall or panel 475. An arm 532 of insulating material projects outwardly from and is secured to the shaft 530, being split at its outer end to pivotally engage the flattened end 534—a of solenoid plunger 534. Associated with the plunger 534 is the solenoid magnet 536 mounted upon the panel board or wall 475. The shaft 530 is provided with an arm 530—a at one end which has an angularly formed tip 430—b with which coacts a coiled tension spring 539 secured at one end to the panel board 475 in a plane with the axis of shaft 530, the arrangement being such that when the arm 530 is moved in either direction to shift the head 525—a of contact arm 525 out of contact with one drum into contact with the other, the spring 539 as will serve as a snap-over to effect a quick movement and eliminate arcing. The spring will also serve to yieldingly hold the head 525—a in close contact with one or the other of the drum ends as will be apparent. Projecting into the gap between the two drums, on one end of drum 491, is a cam 491—c arranged to contact the head of arm 525 to positively shift it out of contact with drum 491 into contact with drum 490 as the second cycle of operations controlled by drum 491 is completed. The movement of the arm 525 in the opposite direction is effected by the solenoid 534 and magnet 536, conductor 516 being wound about magnet 536 whose operation will be more fully described hereinafter.

The slide bar 57 is provided with a collar 57—a near one end by reducing its diameter, at which end is also located the solenoid magnet 550 which is arranged to attract as a solenoid plunger the bar 57.

Two separate windings are provided for the magnet 550 as illustrated in Fig. 26, the one comprising the conductor 555 electrically connected to negative wire B and to conductor 184. The other winding is formed with conductor 511 which is electrically connected to negative wire B. Associated with the solenoid magnet 550 is a second angularly arranged magnet 558 controlling the solenoid plunger 560 which, when in normal or rest position, lies in the path of travel of the shoulder 57—a so that upon excitation of magnet 550 by means of the conductor 555 the slide or bar 57 will be moved to its second position and will be prevented from moving there-beyond by contact of the shoulder 57—a with the plunger 560.

The conductor 511 also forms a winding for the magnet 558 so that with current flowing through this conductor both magnets 550 and 558 are simultaneously excited and the plunger 560 is retracted from its stop or detent position, permitting the bar 57 to be moved to its third or ultimate right-hand position as viewed in Fig. 26. It will be noted that the conductor 511 leads to the contact arm F', the purpose of this apparatus briefly being to provide for re-set of less than the entire ten pins, as will be more fully described.

A conductor 580 is electrically connected to conductor 194 and leads to and is wound around the solenoid 187 from which it leads to connection with the positive line wire, A, through switch 183. From this conductor 580 leads a branch conductor 581 which is wound about a solenoid magnet 583 with which co-acts an opposing magnet 584. A solenoid plunger co-acts with the magnets 583, 584 and is pivotally connected to the switch arm 586 to move the same into and out of connection with a terminal 588 of a conductor 590 which supplies current to the drum-rotating motor 488. From this motor leads the complementary conductor 592. A branch conductor 593 leads from conductor 592, is wound about the solenoid magnet 584, and leads to the contact arms E' with which it is electrically connected.

As stated previously the switch 183 is normally open but is closed momentarily by the impact of ball or pins against the bumper 190. A parallel switch circuit consisting of conductor 570 and hand-operable switch 571 is provided to obtain by hand the same effect as by the closing of switch 183. Switch 571 may be located at or near the head of the alleys.

When the bowling operations start it may be assumed that all of the pins are standing on their proper spots. The delivery of the first ball will initiate the operation by impact of the ball or pins with the bumper 190, the movement of which will temporarily close the switch 183. This temporary closure of the switch sets in motion a series of operations. It should be borne in mind that presumably the pins are all standing upon the spots and the drums 490 and 491 are at rest with the contacter arm 525 contacting the end-face 490—a of drum 490 and with all of the contact arms 498 out of contact with their respective contacts 493. These operations may be listed as follows:

1. The circuit including conductors 555, 184, A and B is closed and the magnet 550 is thereby excited, which results in the shift of the bar 57 and the plurality of switch arms 56 to the second position, such movement being limited by the plunger 560 which is undisturbed. This moves the switch arms 56 into contact with the contacts 514 which closes the plurality of circuits including the conductors 54 and the spots 52. All of these circuits being in parallel, the closure of any one by the location of a pin on its spot will complete circuit through conductor 516. It should be noted also that when the switch arms 56 are moved from the contacts 458 the circuits including the conductors 452 and the light elements 451 are opened and the lights extinguished.

2. The closing of the circuit including conductor 516 excites the magnet 536 if any of the pins are standing, which shifts the contact arm 525 into contact with drum 491. If all of the pins have been knocked down or a "strike" made, as it is termed, the magnet 536 will not be excited and the contact arm 525 will stay in electrical contact with the one-cycle drum 490.

3. The closure of switch 183 (or switch 571) also closes the circuit including conductor 580 and branch conductor 581 wound about solenoid magnet 583. This results in movement of solenoid plunger 585 and switch arm 586 into contact with terminal 588 closing circuit through the motor 488. This results in temporary excitation of the magnet 583 moving the switch 586 to closed position which starts the motor 488 and the rotation of the drums 490 and 491.

4. The conductor 580 is wound about the magnet 187 and when switch 183 is closed this magnet will be excited moving the switch 189 to circuit closing position, thereby closing the circuit through motors 166 and 309, which starts the rotation of the table 72, the movement of the pin conveying and delivering mechanism and the pin feeding mechanism which includes the frames 302, 303 and their fingers 302—a, 303—a.

5. The drum 490 being in circuit as described and rotating in the direction of the arrow in the development diagram in Fig. 27, contact H will strike contact arm H' closing the circuit which includes conductor 508 and all of the windings of conductor 297 about magnets 293 so that all of the ten pin receiving members 280 are released and discharge their bowling pins into the setting rack.

6. In the continued rotation of drum 490 contact D strikes contact arm D' closing the circuit through solenoid magnet 549 which returns the slide or bar 57 to its first or rest position.

7. Still further rotation of the drum 490 results in the striking of contact C with contact arm C' which closes the circuit through solenoid magnet 600, which in turn closes the circuit through sweep motor 422 which starts the sweeping operation to clear the alley and the gutters of pins.

8. The sweep in its return travel sets in actuation motor 346 of the pin setting rack as described above and the rack will deposit its load of a complete set of ten pins upon the proper spots on the alley and will then return to normal or rest position leaving the alley ready for delivery of another ball. During the operation of the sweep and pin setting mechanisms the drum 490 completes its rotation until the stop contact E strikes its arm E' closing the circuit through solenoid magnet 584 which in turn moves the switch arm 586 to open position stopping the operation of the drum motor, there being sufficient momentum to carry the contact E past its contact arm E' ready for the next cycle of operations.

9. If less than ten pins are knocked down by the first ball delivered the slide bar 57 is moved to its second position wherein the arms 56 contact the terminals 514 as described above, but in this event at least one pin remaining upon its spot, the circuit which includes conductor 516 will be closed and the magnet 536 excited which shifts the contact arm 525 into contact with the end face of drum 491.

10. Just as described above, rotation of the drums ensues and the turntable and feed motors 166, 309 are set in motion. The contact F first meets its contact arm F' during the rotation of the "two-cycle" drum which closes the circuit including conductor 511 and results in excitation of magnets 550 and 558, the effect of which is to move the slide bar 57 to its third position closing those circuits which include conductors 296 and conductors 54, upon the spots of which pins are still standing. For example, if three pins as numbers 4, 7 and 8 are standing after the delivery of the first ball, magnets 293 bearing the separate numerals 4—a, 7—a and 8—a, are the only ones excited and as a consequence only those pin receiving members 280 whose detents 290 are tripped deposit their pins in the setting rack. In other words, only the pins for setting upon spots 4, 7 and 8 are charged into the setting rack.

11. The contact D of drum 491 next strikes its contact arm D' and the slide or bar 57 is returned to its first or rest position in the manner described above, the shoulder construction of the bar permitting this return movement without interference from the plunger 560 as will be obvious.

12. Contact C next encounters its contact arm C' and the sweep and pin setting mechanisms are successively set in operation as previously described, the pin setting rack, containing only pins for deposit upon the spots 4, 7 and 8, re-sets those pins which were left standing after the delivery of the first ball preliminary to the delivery of the second ball.

13. Drum 491 will thereafter continue to rotate until the stop contact E meets its contact arm E' and opens the circuit through the drum motor 488 as described above.

14. After the delivery of the second ball drum 491 starts its second cycle or half revolution whereupon the contact H of such drum first meets its contact arm H' and closes the circuit including conductors 508 and 297 including all of the windings through the magnets 293 which as described above effects a full charging or a "ten-set" as I term it, of the pin setting rack preliminary to re-setting all of the pins on the alley before the beginning of another "frame".

15. The contact D strikes its arm D' returning the slide 57 to its first or rest position in the manner described, after which the sweep contact C initiates the operation of the sweep and pin setting mechanisms. The cam 491—c positively moves the contact arm 525 out of contact with the drum 491 before the completion of the rotation thereof and the kick-over spring 539 described above snaps the arm 525 into electrical contact with drum 490.

Should the users or manager of the alley wish to set in operation the mechanisms described without delivering a ball, the same effect may be produced by temporary closure of the switch 571 as will be obvious. This is desirable, for example, when a spare has been made in the last frame of the game and all of the pins are not knocked down on the next ball, which is the only extra ball permitted in such event. It is then necessary to re-set all of the pins preliminary to the start of the new frame and this may be done by temporary closure of the switch 571, which results in completion of its second-cycle movement by drum 491 with the consequent functioning of the mechanisms.

Additional operations

The description of the control mechanism affords an incomplete recital of the operation of all of the functioning mechanisms and it is desirable to supplement the same by stating that when the first ball has been delivered the ball is removed from the table and kicked into the trackway 108 over which it passes to the ball elevating and return mechanism which as described above operates to lift the ball and discharge it upon the return track 136 from whence it rolls by gravity and momentum to the head of the alley.

The pins are removed from the table and conveyed upwardly into and through the trough 241 for delivery on the trackway formed by the pin receiving members 280 and all of such members are charged, after which three pins will accumulate as illustrated in Fig. 13 and additional pins conveyed to the trough 241 will be discharged thereover into the chute 298 for return to the pit. After the receiving members 280 have all been charged with a pin the passage of a pin through the chute 298 will result in closing the circuit through the solenoid magnet 193 which will move the switch arm 189 to open position, opening the circuit supplying current to motors 166 and 309, discontinuing further rotation of the table and the pin feeding means. This will leave the pin conveying means wholly or partially charged with pins in addition to the three pins in trough 241 and on shelf 265 and in addition to the ten pins upon pin receiving members 280.

With the exception of the sweep contact the other contacts may be arranged with considerable latitude upon the drums but the pin releasing mechanism should be actuated before the sweep is started in motion in order that ample time be provided for charging of the setting rack before it is set in operation.

By returning the switch bar 57 to its first or rest position the indicator will show by its lights what pins are still standing preliminary to the delivery of the second ball, if there be occasion to deliver a second ball.

It will be apparent that my apparatus is susceptible of modification and variation and I do not wish to be restricted to the form described and shown except as limited thereto by the appended claims interpreted with such range of equivalents as is proper.

What I claim is:

1. In apparatus of the class described, means to receive pins from a bowling alley, including a horizontal rotatable member, means to rotate said member, pin collecting and supporting means associated with said member, and means co-acting with said member to discharge pins therefrom.

2. In apparatus of the class described, means to receive pins and balls from a bowling alley, including a horizontal rotatable member, means associated with said member to remove pins therefrom, means also associated with said member to remove a ball therefrom, and means co-acting with said member to urge said pins and ball to their respective discharging means.

3. In apparatus of the class described, a horizontal rotatable member for receiving pins and balls from a bowling alley, said member being provided with pin and ball receiving pockets and means to urge said pins and balls into said pockets.

4. In apparatus of the class described, a horizontal rotatable member for receiving pins and balls from a bowling alley, said member being provided with pin and ball receiving pockets.

5. In apparatus of the class described, a horizontal rotatable member for receiving pins and balls from a bowling alley, said member being provided with pockets each constructed and arranged to receive only a single pin or ball, and means to separately discharge said pins and balls from said member.

6. In apparatus of the class described, a receiving means including a horizontal rotatable member for receiving pins from a bowling alley, said member being provided with receiving pockets, means to urge said pins into said pockets, and means to remove the said pins from said pockets.

7. In apparatus of the class described, a receiving means including a horizontal rotatable member for receiving balls from a bowling alley, said member being provided with ball receiving pockets and means to remove the balls from said pockets.

8. In apparatus of the class described, a horizontal rotatable disc for receiving pins and balls from a bowling alley, a pin removing device adjacent the periphery of the disc, and a ball removing device adjacent another point in the periphery of the disc whereby the pins and balls are segregated for subsequent operations.

9. In apparatus of the class described, a horizontal rotatable disc for receiving the pins and balls from a bowling alley, a deflecting means for directing the pins and balls radially outwardly on said disc, a pin removing device adjacent the periphery of the disc, a ball removing device adjacent the periphery of the disc, and means for rotating the disc whereby the pins and balls are segregated for subsequent operations.

10. In apparatus of the class described, a substantially horizontally rotatable disc for receiving the pins and balls from a bowling alley, a spiral stationary deflector for directing the pins and balls radially outward on said disc, said deflector having a portion substantially concentric with the periphery of the disc and spaced inwardly therefrom substantially the width of a pin.

11. In apparatus of the class described, a substantially horizontally rotatable disc for receiving the pins and balls from a bowling alley, a spiral stationary deflector for directing the pins and balls radially outward on said disc, said deflector having a portion substantially concentric with the periphery of the disc and spaced inwardly therefrom substantially the width of a pin, said table being formed with pockets outwardly of said deflector each to receive a pin or ball.

12. In apparatus of the class described, a substantially horizontally rotatable disc for receiving the pins and balls from a bowling alley, a spiral stationary deflector for directing the pins and balls radially outward on said disc, said deflector having a portion substantially concentric with the periphery of the disc and spaced inwardly therefrom substantially the width of a pin, an arm extending from the end of said deflector to the periphery of the disc for removing the pins from the disc whereby the pins and balls are segregated for subsequent operations.

13. In apparatus of the class described, a horizontally rotatable disc for receiving the pins and balls from the alley, a spiral stationary deflector for directing the pins and balls to the periphery of the disc, the inner end of said deflector being in the center and the outer end of said deflector being spaced from the edge of the disc substantially the width of a pin, a pin removing device at the outer end of said deflector, and a ball removing device at a point where the deflector is spaced from the edge of the disc substantially the diameter of the ball.

14. In apparatus of the class described, a horizontally rotatable disc for receiving the pins and balls from a bowling alley, a deflector for directing the pins and balls to the periphery of the disc, means for positively ejecting the ball, and means actuated by the rotation of the disc for actuating said first means.

15. In apparatus of the class described, means for receiving and segregating the pins and balls, means for returning a ball to the player comprising an elevating mechanism, a rack in said elevating mechanism, a motor adapted upon rotation to reciprocate said rack, a switch in said motor circuit, means responsive to the reception of a ball in said elevating mechanism for closing said switch whereby the rack will be elevated and returned, means to interrupt the motor circuit, actuated when the rack reaches a predetermined position in its return to its normal position.

16. In apparatus of the class described, means for returning a ball to the player comprising an elevating mechanism, a rack in said elevating mechanism, a motor adapted upon rotation to reciprocate said rack, a switch in said motor circuit, means responsive to the reception of a ball in said elevating mechanism for closing said switch whereby the rack will be elevated and returned, means to interrupt the motor circuit actuated when the rack reaches a predetermined position in its return to its normal position.

17. In apparatus of the class described, means for returning the balls to the player including an elevating mechanism, a shelf in said elevating mechanism, a motor for elevating and lowering said shelf, a switch in said motor circuit, means responsive to the reception of a ball upon the shelf to close said switch causing the motor to elevate the shelf, means preventing the entrance of another ball in the elevating mechanism when the shelf is elevated, a switch for causing the interruption of the motor circuit and means for actuating said last mentioned switch when the shelf reaches a predetermined position upon its return to its normal position.

18. In apparatus of the class described, means for returning the balls to the player including an elevating mechanism, a shelf in said elevating mechanism, a motor for elevating and lowering said shelf, a switch in said motor circuit, means responsive to the reception of a ball upon the shelf to close said switch causing the motor to elevate the shelf and an arm movable out of the path of a ball by the shelf when in its lower position, said arm moving into the path of a ball when the shelf is raised to prevent the entrance of another ball to the elevating mechanism.

19. In apparatus of the class described having a pin receiving means, means for conveying the pins from the pin receiving means with their ends indiscriminately arranged, means for arranging the pins with their heads in one direction, a pin setting mechanism, feeding means for the pin setting mechanism, means to supply said feeding mechanism with pins from said pin arranging means, and means controlling the actuation of said feeding means to supply predetermined selected pins to the setting mechanism.

20. In apparatus of the class described having a pin receiving means, a pin setting mechanism, feeding means for the pin setting mechanism, said feeding means being adapted to hold as many pins as the setting mechanism, means to supply the feeding mechanism with pins, and means for causing the feeding means to feed predetermined selected pins to the setting mechanism.

21. In apparatus of the class described adapted for automatic operation, means for collecting pins, a pin setting mechanism having a plurality of pockets, feeding means for said setting mechanism comprising a plurality of tiltable members, means to deposit the arranged pins one upon each member, a transferring means associated with each member leading to a pocket in the setting mechanism, and means for selectively controlling the tilting of said members to cause the pins thereon to be transferred to corresponding pockets in the setting mechanism.

22. In apparatus of the class described adapted for automatic operation, a pin setting mechanism, feedings means for said mechanism comprising a plurality of members, means for depositing a pin upon each member and transferring means associated with each member leading to the said mechanism and means for selectively causing the pins on said members to be transferred to the setting mechanism.

23. In apparatus of the class described, a pin feeding device comprising a plurality of pin receiving members, said receiving members forming an inclined trackway, means for conveying pins to the higher end of the trackway, means controlling the passage of the pins from one member to another, means for interrupting the passage of the pins when all of said members are supplied with a pin, and means for selectively discharging pins from said members.

24. In apparatus of the class described, an alley provided with a plurality of pin positions, means for conveying the pins to a feeding device, a plurality of tiltable members in said feeding device each adapted to receive a pin thereon, said receiving members forming an inclined trackway, the pins being received from said conveying means at the higher end of the trackway, means for controlling the passage of the pins from one member to another until all of said members are supplied with a pin, a pin setting device having a plurality of pockets, a transfer means connecting each of said pockets with one of said members for transferring a pin from the member to a pocket, means for selectively controlling the tilting of said members in accordance with the pins remaining in said pin positions whereby the pins which remain standing after the bowling of a ball will be reset.

25. In apparatus of the class described, a pin feeding mechanism comprising a plurality of members forming an inclined trackway, means for conveying pins to the upper end of said inclined trackway, a plurality of reciprocating fingers for controlling the passage of pins to said members, alternate sets of said fingers reciprocating in opposite phase and means for selectively discharging pins from said members.

26. In apparatus of the class described for use with a bowling alley having a plurality of pin positions, means for receiving the pins from said alley, a pin feeding mechanism comprising a plurality of tiltable members forming an inclined trackway, means for conveying the pins from said arranging means to the upper end of said inclined trackway, a plurality of reciprocating fingers for controlling the passage of the pins to said members, alternate sets of said fingers reciprocating in opposite phase, means for resetting the pins upon said alley after the tilting of said members and means for selectively tilting said members in accordance with the pins remaining in said pin positions.

27. In apparatus of the class described, a pin feeding mechanism, means for supplying one pin at a time to said feeding mechanism, said means comprising a chute, a member in said chute operating upon the receipt of a pin to block the admission of another pin, a pin receiving shelf, means for retaining the pin upon said member until the pin is removed from said shelf, said receiving shelf being constructed and arranged to receive the pin from said member whereby another pin will be transferred to said member.

28. In apparatus of the class described, a pin feeding mechanism, means for supplying one pin at a time to said feeding mechanism comprising a chute, means to block the entrance of another pin into said chute when a pin is therein, a switch adapted to be closed when a pin is in said chute, a stop block for retaining the pin in said chute, a magnet for actuating said stop block, a pin receiving shelf, a switch arranged to be open when a pin is on the pin receiving shelf and closed when the shelf is vacant whereby in said latter case the circuit through said magnet will close and whereby the stop block will be elevated to allow another pin to be transferred to said pin receiving shelf.

29. In apparatus of the class described, a pin setting rack, a feed mechanism for supplying pins to said rack comprising a shelf and a plurality of members in alignment, means for supplying pins to said members including means for delivering pins to said shelf, means for successively transferring a pin from the shelf to the members until the members are filled, a magnet controlling the discharge of a pin from each member, and means for selectively energizing said magnets for transferring pins to said rack.

30. In apparatus of the class described, a pin setting rack, a feed mechanism for supplying pins to said rack comprising a plurality of tiltable members, a latch for preventing said members from tilting, a pin distributing mechanism for placing a pin upon each of said members, a magnet for each member for operating said latch whereby the pin upon said member will be transferred to the pin setting rack, and means for selectively energizing said magnets for transferring pins to said rack.

31. In apparatus of the class described, a pin conveying means, a pin arranging means associated therewith comprising an inclined plane for receiving the pins from said conveying means, said inclined plane having a longitudinal slot narrower than the body of a pin, a loop pivotally mounted in said slot normally held in its upper position by a spring, said loop being merely deflected when a pin with its head directed upwardly contacts therewith but engaging the neck of a pin with its head directed downwardly to invert the pin whereby all of the pins will be arranged with their heads extending in one direction.

32. In apparatus of the class described, a pin conveying means, a pin arranging means associated therewith, means for ejecting a pin from the conveying means upon said arranging means, the arranging means comprising an inclined chute having a longitudinal slot therein narrower than the body of a pin, a pivotally mounted loop, a spring for normally holding said loop above the plane of the chute, said loop allowing the pins with their heads projecting upwardly to pass without changing their position and inverting the pins with their heads projecting downwardly whereby all of the pins will be arranged with their heads in one direction.

33. In apparatus of the class described, pin arranging means comprising an inclined chute having a longitudinal slot therein narrower than the body of a pin, a pivotally mounted loop, means for normally holding said loop above the plane of the chute, said loop allowing the pins with their heads projecting in one direction to pass without changing their position and inverting the pins with their heads projecting in the opposite direction whereby all of the pins will be arranged with their heads in one direction.

34. In an apparatus of the class described, a pin conveying means, a pin arranging means associated therewith, a second pin conveying means adapted to receive pins from the arranging means, said second pin conveying means comprising an endless conveyor having a plurality of spaced projections thereon, said arranging means including a member having an aperture therein substantially conforming to the contour of a pin to permit a pin to drop therethrough upon the second conveyor, a stop member normally preventing a pin from falling therethrough, said member being actuated by said conveyor for releasing a pin when the projections reach a predetermined position.

35. In apparatus of the class described, a pin and ball segregating device and an actuating means therefor, a control drum, actuating means therefor, a switch actuated by a bowled ball or pin for energizing actuating means, a sweep rack for clearing the alley and an actuating means therefor, said sweep rack actuating means being energized when the control drum reaches a predetermined position and deenergized when the sweep rack is returned to its normal position, a pin setting rack and an actuating means therefor, the pin setting rack actuating means being energized when the sweep reaches a predetermined position and deenergized when the rack reaches a predetermined position, and means cooperating with said pin setting rack to selectively set a number of pins in accordance with a predetermined plan.

36. In apparatus of the class described, a pin and ball segregating device, a ball return mechanism for returning the balls to the player, means for sweeping the alley upon each rolling of a ball down the alley, a feeding mechanism, means for returning the pins to said feeding mechanism, a pin setting rack, means responsive to the rolling of the first ball and the removal of a portion of the pins for causing the alley to be swept and the pins left standing after the rolling of the ball to be reset, means responsive to the rolling of the second ball thereafter for causing the resetting of all of the pins irrespective of the number of pins removed by the second ball and means responsive to the rolling of the first ball and the removal of all of the pins for causing a resetting of all of the pins and the beginning of a new cycle.

37. In apparatus of the class described, means responsive to the rolling of the first ball of a frame and the removal of a portion of the pins for causing the alley to be swept and pins reset corresponding to the pins left standing, after the rolling of the ball, means responsive to the rolling of the second ball of the frame for causing the resetting of all of the pins irrespective of the number of pins removed by the second ball.

38. In apparatus of the class described, means for sweeping the alley after each rolling of a ball down the alley and means responsive to the rolling of the first ball of a frame and the removal of all of the pins to reset the same to begin another frame.

39. In apparatus of the class described, means for sweeping the alley after each rolling of a ball down the alley, means responsive to the rolling of the first ball of a frame and the removal of a portion of the pins for causing the alley to be swept and pins reset corresponding to the pins left standing after the rolling of the ball.

40. In apparatus of the class described, an alley having a pin receiving end, a pair of contacts at each pin position, said pin contacts being adapted to be bridged by a pin, a pin setting mechanism provided with a plurality of pockets, a feed mechanism for said setting mechanism, means in said feed mechanism having pin positions for holding a pin in readiness for each pocket of the setting mechanism, a magnet for each pin position of said feed mechanism controlling the discharge of a pin from said mechanism to the setting mechanism, a plurality of parallel circuits each including one of said magnets and the contacts of a pin position, and a switch adapted upon operation to one position to energize each magnet in a circuit having a pin bridging the contacts whereby a pin will be fed to the setting mechanism for each pin bridging a pair of contacts.

41. In apparatus of the class described, an alley having a pin receiving end, a pair of contacts at each pin position, said contacts being adapted to be bridged by a pin, a pin feeding mechanism, members in said feeding mechanism for holding a pin in readiness for each pin position, magnets for selectively controlling the discharge of pins from said members, a plurality of parallel circuits each including one of said magnets and the contacts of a pin position and a multiple switch for closing said circuits to energize a magnet in each circuit having a pin bridging the pin position contacts whereby a pin will be discharged from the members of the feeding mechanism for each pin bridging a pair of contacts.

42. In apparatus of the class described, an alley having a pin receiving end, a pair of contacts at each pin position, said contacts being adapted to be bridged by a pin, pin setting mechanism provided with a receiving means for each pin, a feeding mechanism also provided with a receiving means for each pin for charging into the corresponding receiving means of said setting mechanism, a circuit for and including each pair of contacts, an electrically actuated means for each of said receiving means of said feeding mechanism also in circuit with a pair of said contacts and a controlling means operable to close each of said circuits in which the pin contacts are electrically connected whereby the actuating means corresponding to said closed circuits will be actuated.

43. In apparatus of the class described, an alley having a pin receiving end, a pair of contacts at each pin position, said contacts being adapted to be bridged by a pin, pin setting mechanism provided with a receiving means for each pin, a feeding mechanism also provided with a receiving means for each pin for charging into the corresponding receiving means of said setting mechanism, an electrically actuated actuating means for each of said receiving means of said feeding mechanism, a circuit for and including each of said actuating means, a source of current and a control means to connect said circuit with said source of current to charge said pins into said pin setting mechanism.

44. In apparatus of the class described, an alley having a pin receiving end, a pair of contacts at each pin position, said contacts being adapted to be bridged by a pin, pin setting mechanism provided with a receiving means for each pin, a feeding mechanism also provided with a receiving means for each pin for charging into the corresponding receiving means of said setting mechanism, an electrically actuated actuating means for each of said receiving means of said feeding mechanism, a circuit for and including each of said actuating means, a source of current and a control means to connect said circuit with said source of current to charge said pins into said pin setting mechanism, actuating means for said control means responsive to the removal of all of the pins from said contacts to throw said control means into operating condition.

45. In apparatus of the class described, an alley provided with a plurality of pin positions, a pair of contacts at each pin position, pins for conductively bridging said contacts, a plurality of magnets, a plurality of parallel circuits each including a pair of said contacts and a magnet, said magnets having a double winding, a multiple switch having a plurality of contact positions, a switch operable by a bowled ball for causing the actuation of the multiple switch, a drum, means responsive to the removal of all of said pins from said pin position contacts upon the bowling of a ball for moving the multiple switch to one position whereby the rotation of the drum causes the energization of one set of windings of all of said magnets, means responsive to the removal of a part of said pins from said pin position contacts upon the bowling of a ball for moving the multiple switch to another position, thereby energizing a portion of the other set of the windings corresponding to the pins remaining to bridge pin position contacts, means responsive to the bowling of a second ball for energizing all of one set of windings of said magnets irrespective of the number of pins removed, and means cooperating with said magnets for setting a pin for each magnet energized.

46. In apparatus of the class described, an alley provided with a plurality of pin positions, a pair of contacts at each pin position, said contacts being adapted to be conductively connected by a pin, a plurality of magnets, a plurality of parallel circuits, each including a pair of said contacts and a magnet, a multiple switch having a plurality of contact positions, means responsive to the removal of all of said pins from said pin position contacts upon the rolling of the first ball of a frame for causing all of said magnets to be energized, and means cooperating with said magnets for setting a pin for each magnet energized.

47. In apparatus of the class described, mechanism for resetting upon a bowling alley pins corresponding to those pins which have been left standing thereon after delivery of a bowling ball, mechanism for resetting the full number of said pins upon said alley and a selecting mechanism automatically operable to determine which of said first two mechanisms is actuated.

48. In apparatus of the class described, mechanism for resetting upon a bowling alley pins corresponding to those pins which have been left standing thereon after delivery of a bowling ball, mechanism for resetting the full number of said pins upon said alley and a selecting mechanism automatically operated by the removal of less than the full number of pins from their spots on said alley to initiate the operation of said first mechanism and operated by removal of the full number of pins to initiate the operation of said second mechanism.

49. In apparatus of the class described, an alley provided with a plurality of pin positions, a pair of contacts at each pin position, a plurality of magnets, a plurality of parallel circuits each including a pair of said contacts and a magnet, a multiple switch having a plurality of contact positions, means responsive to the removal of a portion of said pins from said pin position contacts upon the rolling of the first ball of a frame for moving the multiple switch to one position, causing the energization of the magnets in circuit with the pins remaining in position and means cooperating with said magnets for setting a pin for each magnet energized.

50. In apparatus of the class described, an alley for bowling provided with a plurality of pin positions, mechanism for setting pins in said positions having electrical operating means, a switch operable in response to a bowled ball for starting said electrical operating means, means to cause said mechanism for setting the pins to reset the pins not removed by the first ball of a frame.

51. In apparatus of the class described, an alley for bowling provided with a plurality of pin positions, mechanism for setting pins in said positions having electrical operating means, a switch operative in response to a bowled ball for starting said electrical operating means, means to cause said mechanism for setting the pins to reset all of the pins when removed by the first ball of a frame to begin a new frame.

52. In apparatus of the class described, an alley for bowling provided with a plurality of pin positions, mechanism for setting pins in said positions having electrical operating means, a switch operated in response to a bowled ball for starting said electrical operating means, means to cause said mechanism for setting the pins to reset all of the pins after the bowling of a second ball of a frame.

53. In apparatus of the class described, an alley for bowling provided with a plurality of pin positions, mechanism including electrical operating means for setting pins in said positions, a switch operated in response to a bowled ball for starting said electrical operating means, means to cause said mechanism for setting the pins to reset the pins not removed by the first ball of a frame, and means causing said mechanism for setting the pins to reset all of the pins after bowling of the second ball of a frame.

54. In apparatus of the class described, an alley for bowling provided with a plurality of pin positions, a pair of contacts at each pin position adapted to be conductively connected by the pins, a plurality of parallel circuits each including a pair of said contacts, a magnet in each of said circuits, said magnet having double windings, a multiple switch having a plurality of contact positions, a magnet for actuating said multiple switch, an electrical circuit for said multiple switch magnet adapted to be closed by a bowled ball, a stop member for stopping said multiple switch upon one set of contacts, a magnet for actuating said stop member, a drum having a plurality of contacts thereon, a motor rotating the drum, said motor being energized upon the bowling of a ball, a plurality of brushes cooperating with the drum, one of said brushes being adapted to close the circuit through the magnet for said stop member, allowing the multiple switch magnet to move the multiple switch to a second position to energize a portion of one set of the windings of the magnets in circuit with the pin position contacts, in accordance with the pins bridging said contacts, means responsive to the energization of said magnets for setting pins in said pin positions, said magnet for the stop member of the multiple switch being energized only when less than all of the pins are removed by the first ball whereby one set of windings of said double winding magnets will be energized when a portion of the pins are removed by the first ball and another set of windings will be energized when all of the pins are removed by the first ball.

55. In apparatus of the class described, an alley for bowling provided with a plurality of pin positions, a pin setting rack, a sweep for removing the pins from the alley, an electric motor for operating said rack, an electric motor for operating said sweep, a feed mechanism for feeding pins to said rack, a plurality of magnets for selectively feeding pins to said rack, means including a multiple switch having a plurality of contact positions for selectively energizing said magnets for feeding pins to the said rack, a magnet for actuating the multiple switch, a stop member for stopping the multiple switch on one set of said contacts, a magnet for releasing the stop member, a control drum having a plurality of contact members, a plurality of brushes cooperating therewith, one of said brushes being adapted to close the circuit through the magnet for the stop member, another of said brushes being adapted to close the circuit through the sweep operating motor, another of said brushes being adapted to close the circuit through the rack operating motor, another of said brushes being adapted to establish an electrical circuit for withdrawing the multiple switch to its normal position, the contacts being so arranged on the drum as to maintain a predetermined sequence in the operation of said devices.

56. In an apparatus of the class described, a pin and ball segregating means having electrical operating means, a switch for energizing said electrical operating means upon the rolling of the first ball, a sweep for sweeping balls and pins from the alley, an electric motor for actuating the sweep, a rack for resetting the pins, an electric motor for operating the rack, means for supplying pins to said pin setting rack in accordance with a predetermined plan, a control member having a plurality of contacts, brushes cooperating with said contacts, one of said brushes causing the closing of the circuit through the sweep motor upon the rolling of each ball, another of said brushes causing the energization of the means for supplying the pin setting rack with pins, another of said brushes causing the closing of the circuit through the motor for the pin setting rack, the contacts being arranged upon the control member in such a position as to produce a predetermined sequence in the above operations.

57. In apparatus of the class described, a sweep for removing balls and pin from a bowling alley, a motor for actuating the sweep, a rack for resetting pins, an electric motor for operating the rack means for supplying pins to said pin setting rack in accordance with a predetermined plan, a control member having a plurality of contacts, brushes cooperating with said contacts, one of said brushes causing the closing of the circuit through the sweep motor upon the rolling of each ball, another of said brushes closing the circuit through the motor for the pin setting rack, the contacts being arranged upon the control member in such a position as to produce a predetermined sequence in the above operations.

58. In apparatus of the class described, an alley for bowling provided with a plurality of pin positions, a pair of electrical contacts at each pin position, a plurality of parallel circuits each including a pair of pin position contacts, a magnet having a double winding in each of said circuits, a multiple switch having a plurality of contacts, one set of said contacts leading collectively to a single conductor, the other set of contacts leading individually to one set of windings of said magnets, a pair of control members provided with a plurality of contacts upon each member, an arm engageable with either of said control members, a magnet for actuating said arm, means responsive to the bowling of a ball for moving the multiple switch to the set of contacts leading collectively to the single conductor, thereby connecting the magnet for said arm with the pin position contacts whereby bridging of any pair of contacts at the pin positions causes the energization of the arm-actuating magnet for shifting the arm to the second control member and the absence of a pin bridging a contact allows the arm to remain on the first drum, means for actuating the control members, a stop member for the multiple switch, a magnet for actuating the multiple switch, a brush cooperating with the second member adapted to energize said magnet to move the multiple switch to the second set of contacts thereby energizing the winding of said first mentioned magnets in accordance with the pins bridging contacts at the pin positions, each of said members having a brush cooperating therewith to return the multiple switch to its normal position and means responsive to the energization of the magnets in said parallel circuits for resetting pins in accordance with the magnets energized.

59. In apparatus of the class described, an alley for bowling provided with a plurality of pin positions, a pair of contacts at each pin position, a plurality of parallel circuits each including a pair of said contacts, a plurality of magnets having double windings, a multiple switch having a plurality of contacts, a pair of control members, each member being provided with a plurality of contacts, brushes cooperating with the contacts of said members, an arm engageable with either of said members, a magnet for actuating said arm, means responsive to the bowling of a ball for moving said multiple switch to the first set of contacts whereby the bridging of any contact at the pin positions will cause the magnet for shifting the arm from one drum to the other to be energized, the bridging of one of said contacts causing the arm to remain upon the first member, means for rotating the control members, a stop member for the multiple switch, a magnet for actuating said stop member, a brush on the second member for causing said magnet to be energized to remove the stop member, thereby permitting the multiple switch to be shifted to the second set of contacts whereby a portion of one set of said windings will be energized in accordance with contacts bridged by pins, a magnet for returning the multiple switch to its normal position and a brush for energizing said magnet upon the further rotation of the control members.

60. In apparatus of the class described, an alley for bowling provided with a plurality of pin positions, a pair of electrical contacts at each pin position, said contacts being in a plurality of parallel circuits, a plurality of trip magnets having double windings, each set of said windings being in parallel circuits, a multiple switch having a plurality of contacts, a set of said contacts leading to a common conductor and another set of said contacts leading to one set of windings of the trip magnets, means responsive to the bowling of the first ball of a frame for shifting the multiple switch to one set of contacts, thereby connecting the pin position contacts to said common conductor, a control member comprising a pair of members having a plurality of contacts thereon, brushes cooperating with said contacts, an arm normally engaging the first of said members, a magnet for moving said arm into contact with the second of said members, said magnet being in circuit with the conductor from the second set of contacts whereby the bridging of any contact at the pin positions after the rolling of the first ball will energize said magnet to shift the arm to the second member, a stop member for retaining the multiple switch on the one set of contacts, a magnet for actuating said stop member, means for energizing the stop member magnet upon the rotation of a control member when the arm is in engagement with the second member, thereby removing the stop member and allowing the multiple switch to be moved to the third set of contacts whereby the magnet windings connected therewith will be energized in accordance with the contacts bridged by pins in the pin positions, a magnet for returning the multiple switch to its normal position, means for energizing said magnet upon a further rotation of said control member and means responsive to the energization of the trip magnets for setting pins corresponding to the trip magnets energized.

61. In apparatus of the class described, a pin setting mechanism, actuating means therefor, means to charge pins into said setting mechanism, sweep mechanism, actuating means therefor, a one-cycle control member, electric circuits for said several actuating means controlled by said control member, a two-cycle control member, said electric circuits also being controllable by said two-cycle control member, means responsive to the removal of all of the pins from their spots on a bowling alley to throw said one-cycle control member into control and means responsive to the removal of less than the said full number of pins to throw said two-cycle control member into operation.

62. In apparatus of the class described, a sweep mechanism for sweeping pins and balls from the alley, a pin setting rack for resetting pins upon the alley, a motor for actuating the sweep mechanism, a magnet for closing the circuit of the sweep mechanism motor, a second magnet for opening the circuit of the sweep mechanism motor, means responsive to the bowling of a ball for closing the circuit of said motor to cause the sweep mechanism to operate a motor for operating the pin setting rack, a magnet for closing the circuit through said motor, said magnet being energized when the sweep mechanism reaches a predetermined position, a magnet for opening the circuit of the motor for the pin setting rack, said magnet being energized by the return of the rack to its normal position, the magnet for opening the circuit of the sweep motor being energized upon the sweep mechanism returning to its normal position whereby the sweep mechanism and pin setting rack will be operated in a predetermined sequence.

63. In apparatus of the class described, a sweep mechanism for sweeping the pins and balls from the alley, a pin setting rack for resetting pins upon the alley, a motor for operating the sweep mechanism, a motor for operating the pin setting rack, the motor for the sweep mechanism being energized in response to the bowling of a ball, the motor for the pin setting rack being energized when the sweeping mechanism reaches a predetermined position and deenergized by movement of the rack and means for deenergizing the sweep motor when the sweep mechanism returns to its normal position.

64. In apparatus of the class described, means for sweeping the pins and balls from a bowling alley, a pin setting rack, a motor for said rack, a motor for operating the sweep mechanism in response to the bowling of a ball, a plurality of switches adapted to be closed by the return movement of the sweep mechanism, the operation of one of said switches causing the energization of the rack motor, the operation of the other switch causing the deenergization of the sweep motor.

65. In apparatus of the class described, pin conveying means, a pin feeding apparatus for receiving pins from said conveying means, said pin feeding mechanism being adapted to hold a predetermined number of pins, an overflow chute associated with said pin conveying means whereby pins from the conveying means will pass into the overflow chute when the feeding mechanism is filled, and means associated with said overflow chute responsive to a pin passing therethrough for interrupting the operation of said conveying means.

66. In apparatus of the class described, pin conveying means, a motor for actuating said means, a pin feeding means adapted to be supplied with pins from said conveying means, said pin feeding mechanism being adapted to hold a predetermined number of pins, an overflow chute, a switch in said overflow chute and a magnet operated upon the closing of said switch by a pin passing through the overflow chute to deenergize the motor for said conveying means.

67. In apparatus of the class described, an alley for bowling provided with a plurality of pin positions, a pair of contacts at each pin position adapted to be conductively connected by a pin position, a plurality of parallel circuits each including a pair of said contacts, a magnet in each of said circuits, means operated in response to a first ball of a frame for energizing a magnet for each pin bridging a contact when less than all of the pins are removed, means responsive to a first ball of a frame for energizing all of said magnets when all of the pins are removed, means responsive to a second ball of a frame for energizing all of said magnets irrespective of the number of pins removed and means cooperating with said magnets for resetting a pin for each magnet energized after the bowling of a ball.

68. In apparatus of the class described, having a pin receiving means, means for conveying the pins from said receiving means, a pin setting mechanism, feeding means for the pin setting mechanism, means to supply said feeding mechanism with pins, and means controlling the actuation of said feeding means to supply predetermined selected pins to the setting mechanism.

In witness whereof, I hereunto subscribe my name this 7th day of March, 1929.

RALPH R. CONE.

CERTIFICATE OF CORRECTION.

Patent No. 1,911,436.  May 30, 1933.

RALPH R. CONE.

It is hereby certified that error appears in the printed specification of the above numbered patent requiring correction as follows: Page 20, line 83, claim 42, after the word "actuated" insert the word "actuating"; and that the said Letters Patent should be read with this correction therein that the same may conform to the record of the case in the Patent Office.

Signed and sealed this 22nd day of August, A. D. 1933.

M. J. Moore.

(Seal)   Acting Commissioner of Patents.